United States Patent
Kusaka et al.

(10) Patent No.: US 11,956,356 B2
(45) Date of Patent: Apr. 9, 2024

(54) KEY MANAGEMENT DEVICE AND STORAGE SYSTEM

(71) Applicant: Kioxia Corporation, Tokyo (JP)

(72) Inventors: Masahiro Kusaka, Yokohama (JP); Kenichi Numata, Kokubunji (JP)

(73) Assignee: Kioxia Corporation, Tokyo (JP)

( * ) Notice: Subject to any disclaimer, the term of this patent is extended or adjusted under 35 U.S.C. 154(b) by 366 days.

(21) Appl. No.: 17/349,492

(22) Filed: Jun. 16, 2021

(65) Prior Publication Data

US 2022/0085997 A1 Mar. 17, 2022

(30) Foreign Application Priority Data

Sep. 15, 2020 (JP) ................................ 2020-154498

(51) Int. Cl.
| | |
|---|---|
| *H04L 29/06* | (2006.01) |
| *H04L 9/08* | (2006.01) |
| *H04L 9/32* | (2006.01) |
| *H04L 67/1097* | (2022.01) |

(52) U.S. Cl.
CPC .......... *H04L 9/0894* (2013.01); *H04L 9/0825* (2013.01); *H04L 9/3247* (2013.01); *H04L 67/1097* (2013.01)

(58) Field of Classification Search
CPC ... H04L 9/0894; H04L 9/0825; H04L 9/3247; H04L 67/1097; H04L 9/083; H04L 9/0822; H04L 63/062; G06F 21/78
See application file for complete search history.

(56) References Cited

U.S. PATENT DOCUMENTS

| | | | |
|---|---|---|---|
| 7,778,020 B2 | 8/2010 | Flynn et al. | |
| 10,855,451 B1* | 12/2020 | Allo | ...................... H04L 9/3263 |
| 2009/0092252 A1 | 4/2009 | Noll et al. | |
| 2017/0085374 A1* | 3/2017 | Chen | ....................... H04L 9/083 |
| 2019/0245689 A1* | 8/2019 | Eckel | ........................ G06F 21/74 |
| 2019/0266103 A1* | 8/2019 | Pearson | ................ H04L 9/0897 |
| 2020/0186342 A1* | 6/2020 | Zhang | ..................... H04L 9/083 |

FOREIGN PATENT DOCUMENTS

| | | |
|---|---|---|
| JP | 2010-524410 A | 7/2010 |
| JP | 2013-504820 A | 2/2013 |
| WO | WO 2011/031903 A2 | 3/2011 |

* cited by examiner

*Primary Examiner* — Yogesh Paliwal
(74) *Attorney, Agent, or Firm* — Oblon, McClelland, Maier & Neustadt, L.L.P.

(57) ABSTRACT

According to one embodiment, a key management device includes a storage and a server. The storage includes a first nonvolatile memory, and a first controller configured to encrypt, using a first media encryption key, data from a host, and store the encrypted data in the first nonvolatile memory. The server includes a second nonvolatile memory storing a first key, and a second controller configured to transmit the first key from the second nonvolatile memory to the storage without passing through the host. The first controller is configured to generate the first media encryption key using the first key.

18 Claims, 17 Drawing Sheets

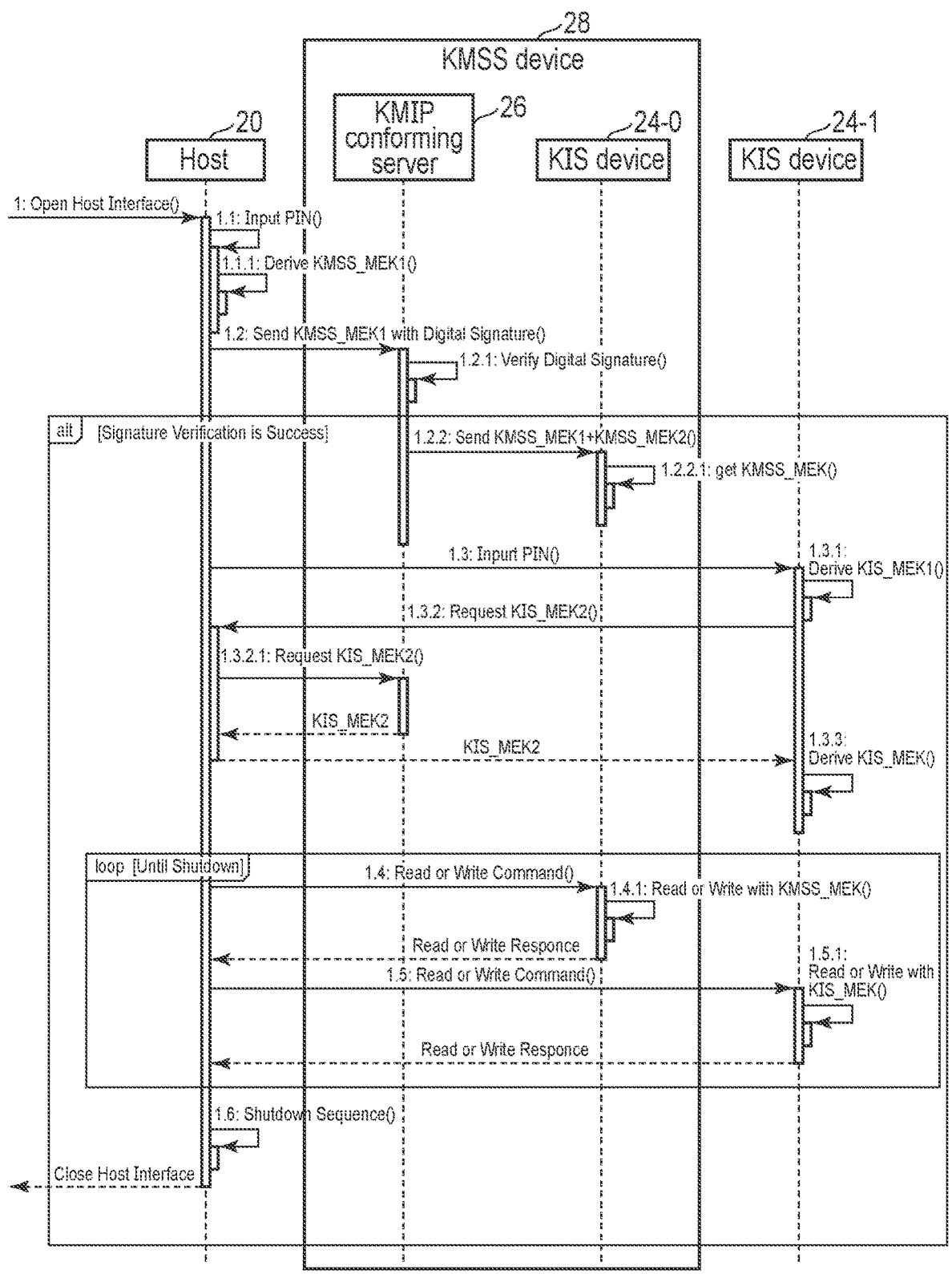
F I G. 3

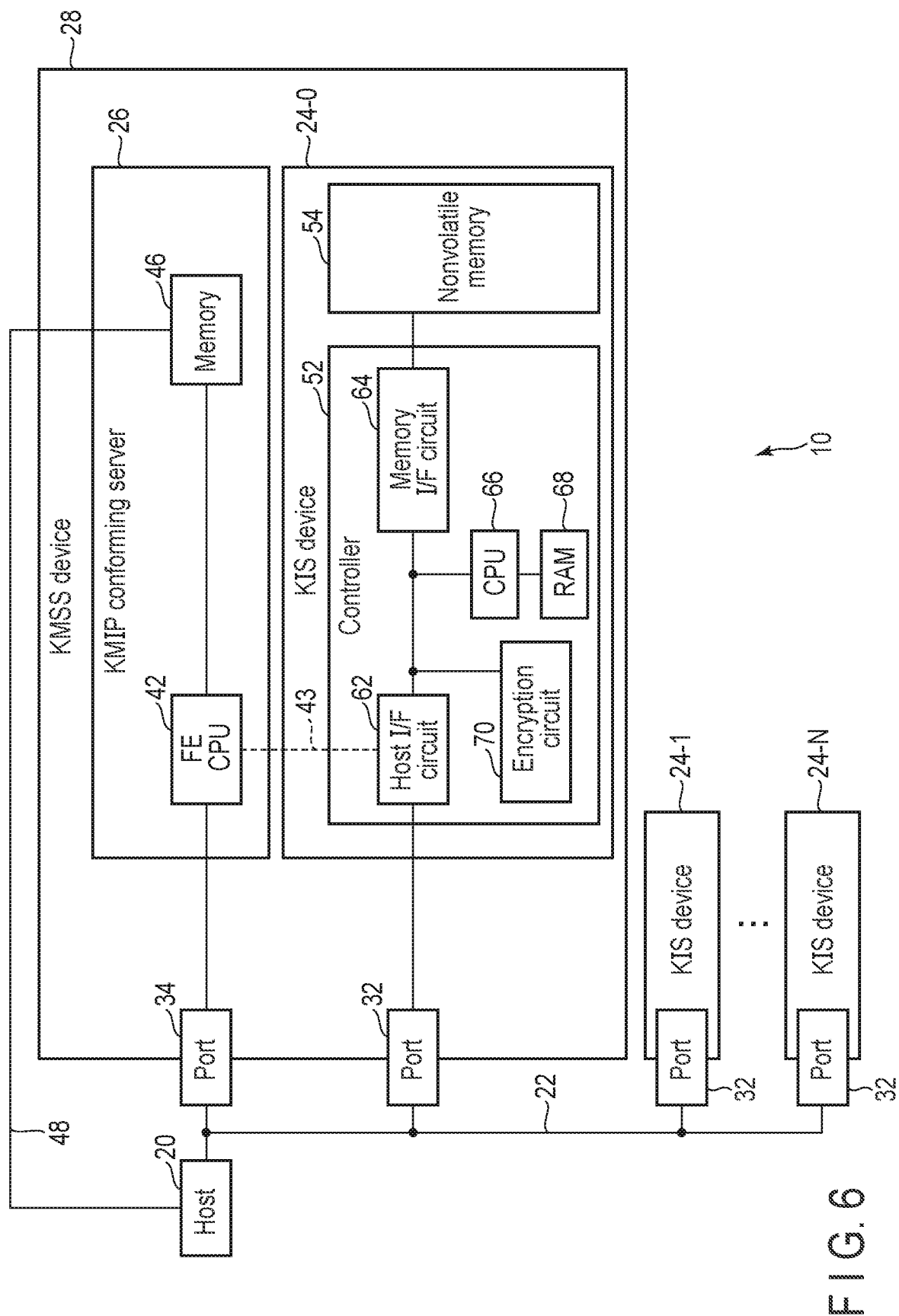
F I G. 6

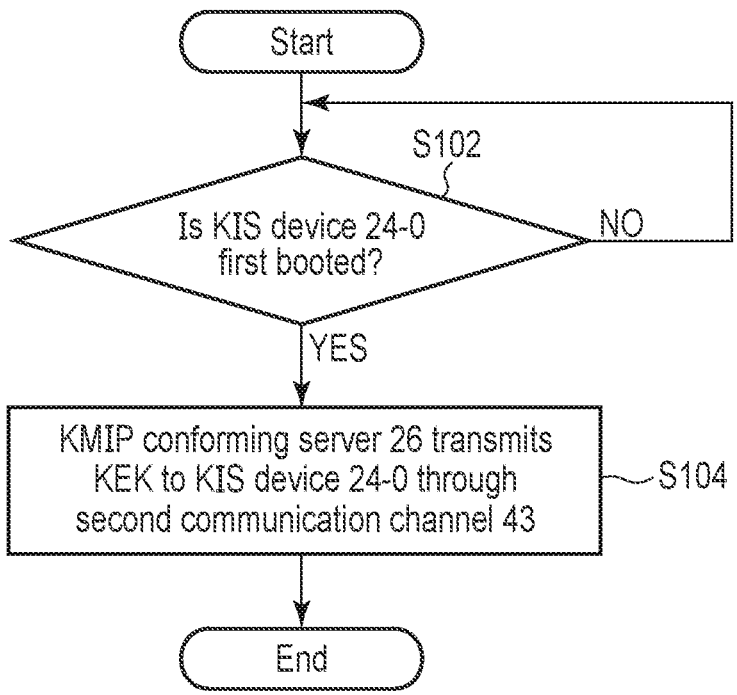
F I G. 7A
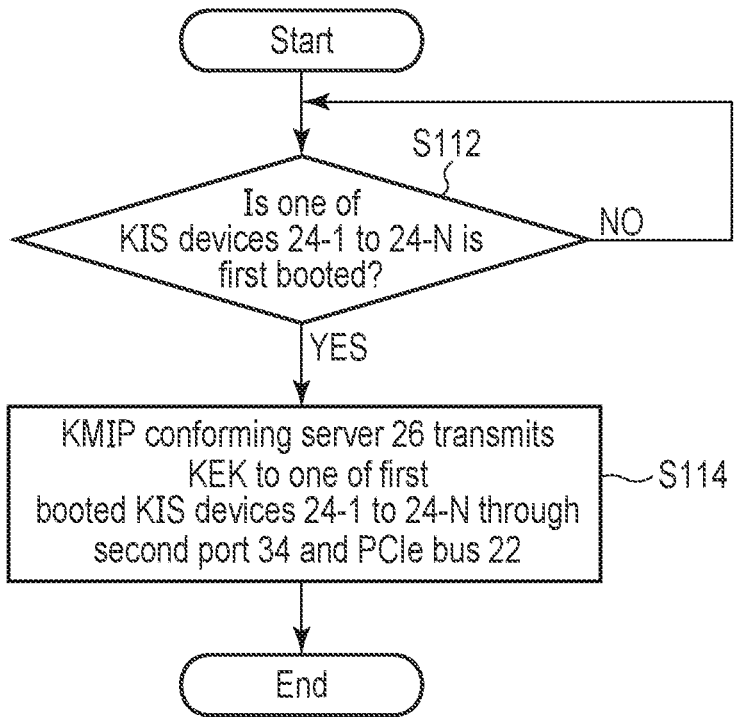
F I G. 7B

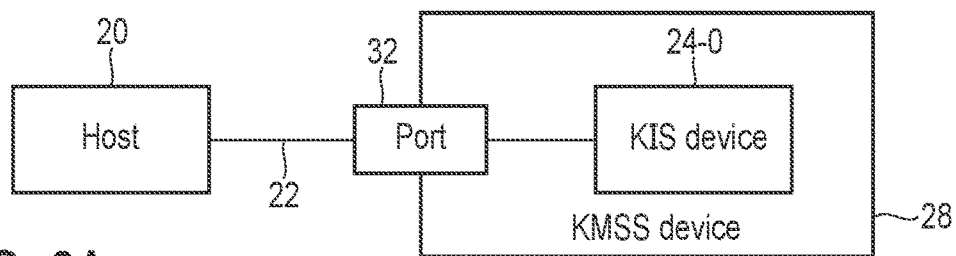
F I G. 8A
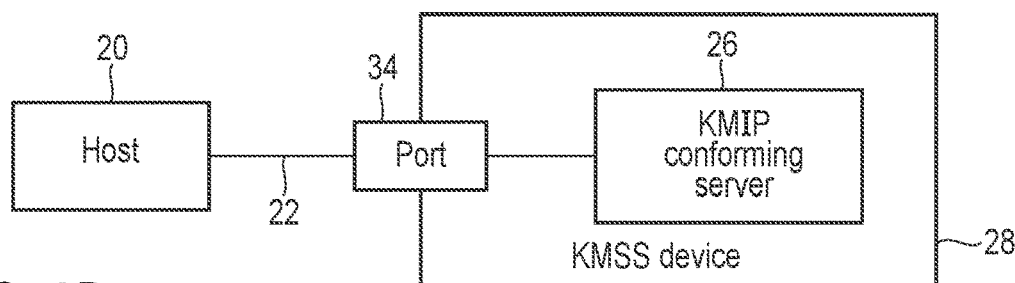
F I G. 8B
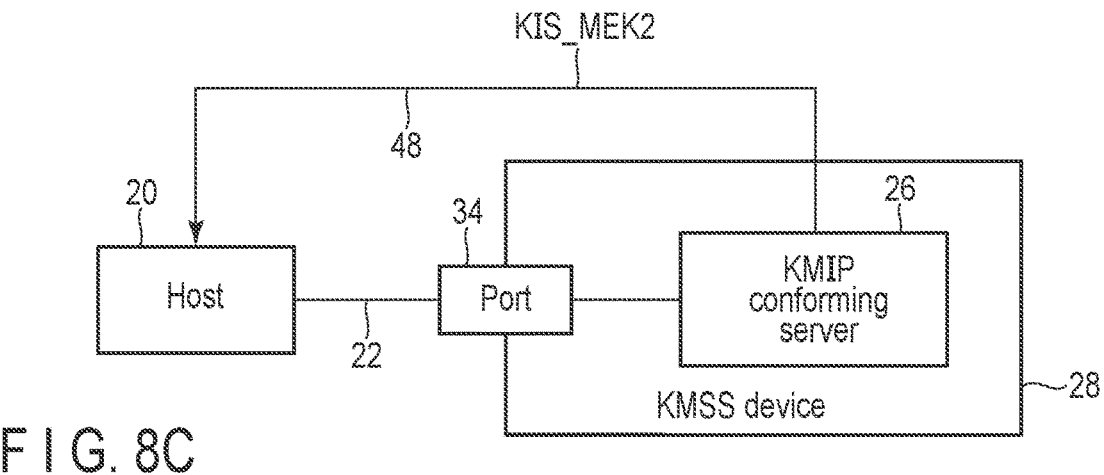
F I G. 8C
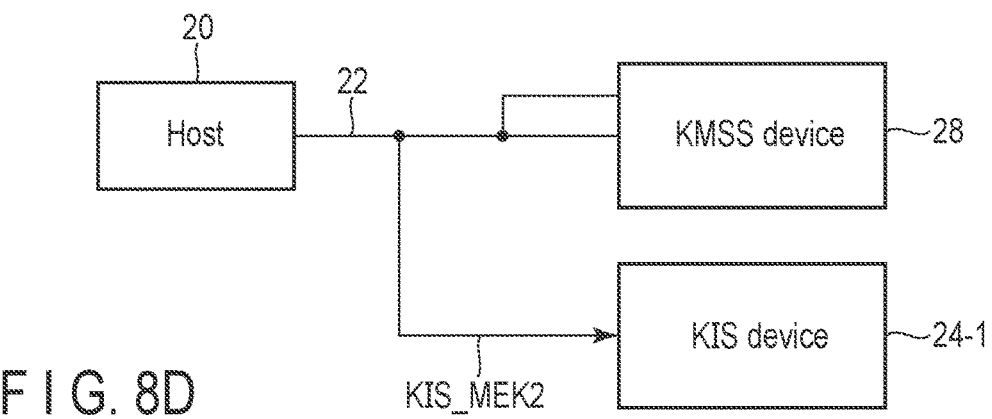
F I G. 8D

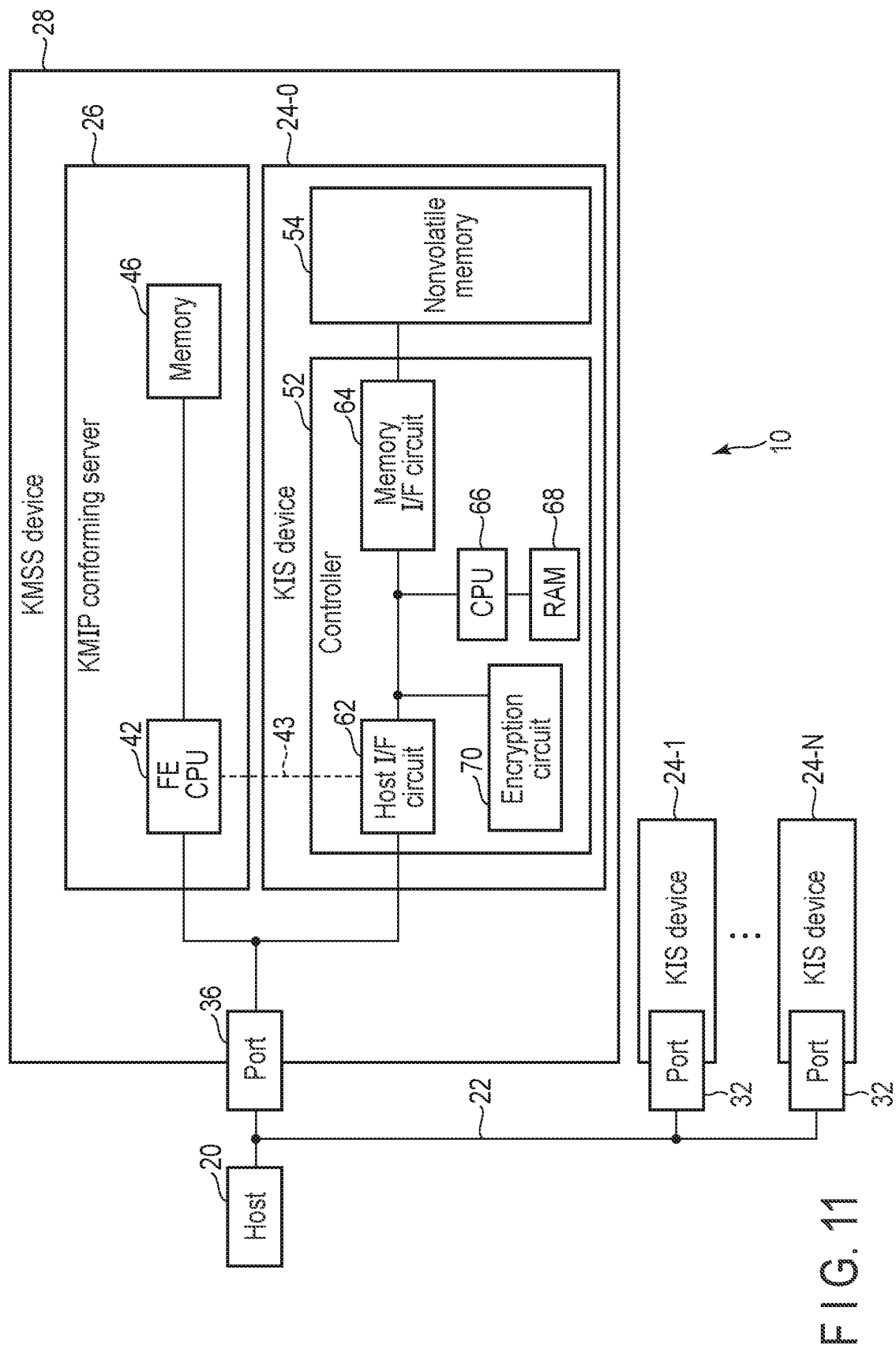
F I G. 11

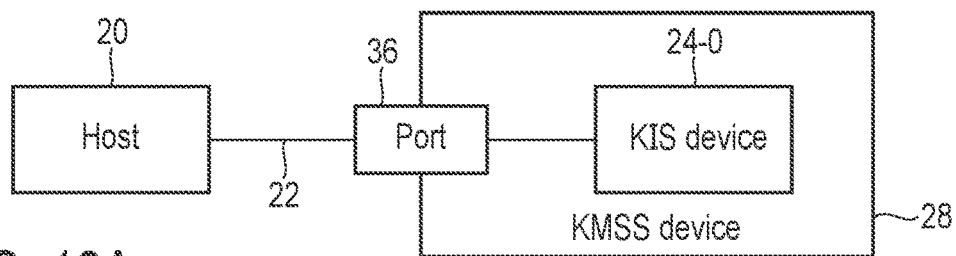
F I G. 12A
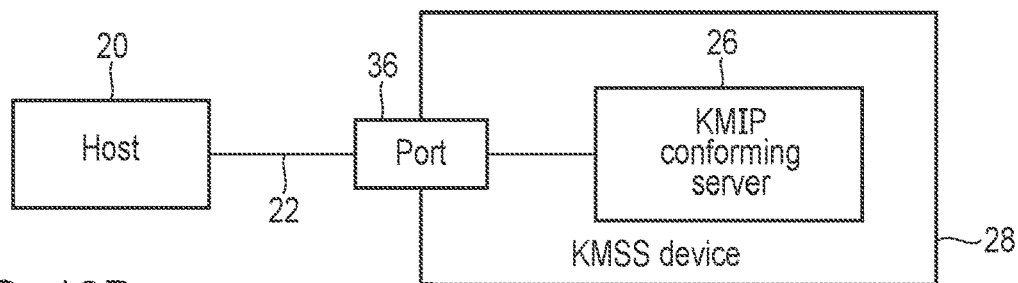
F I G. 12B
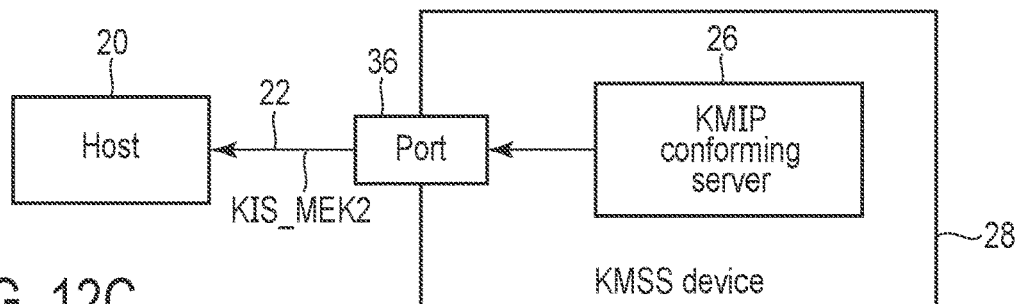
F I G. 12C
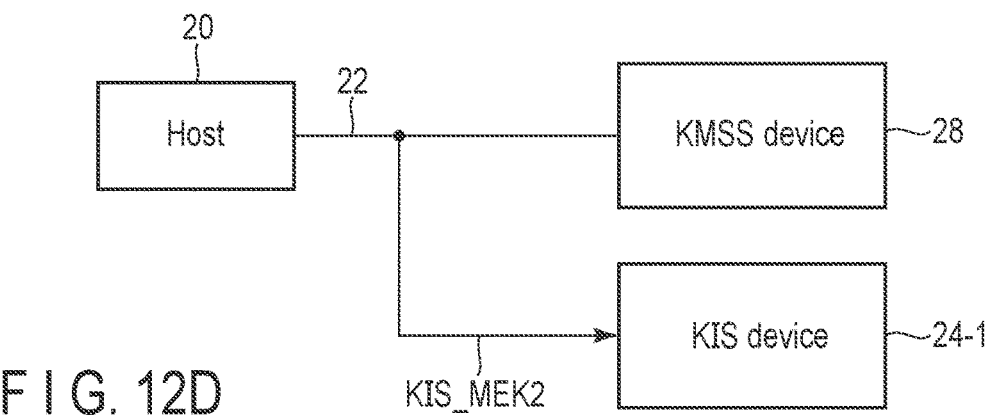
F I G. 12D

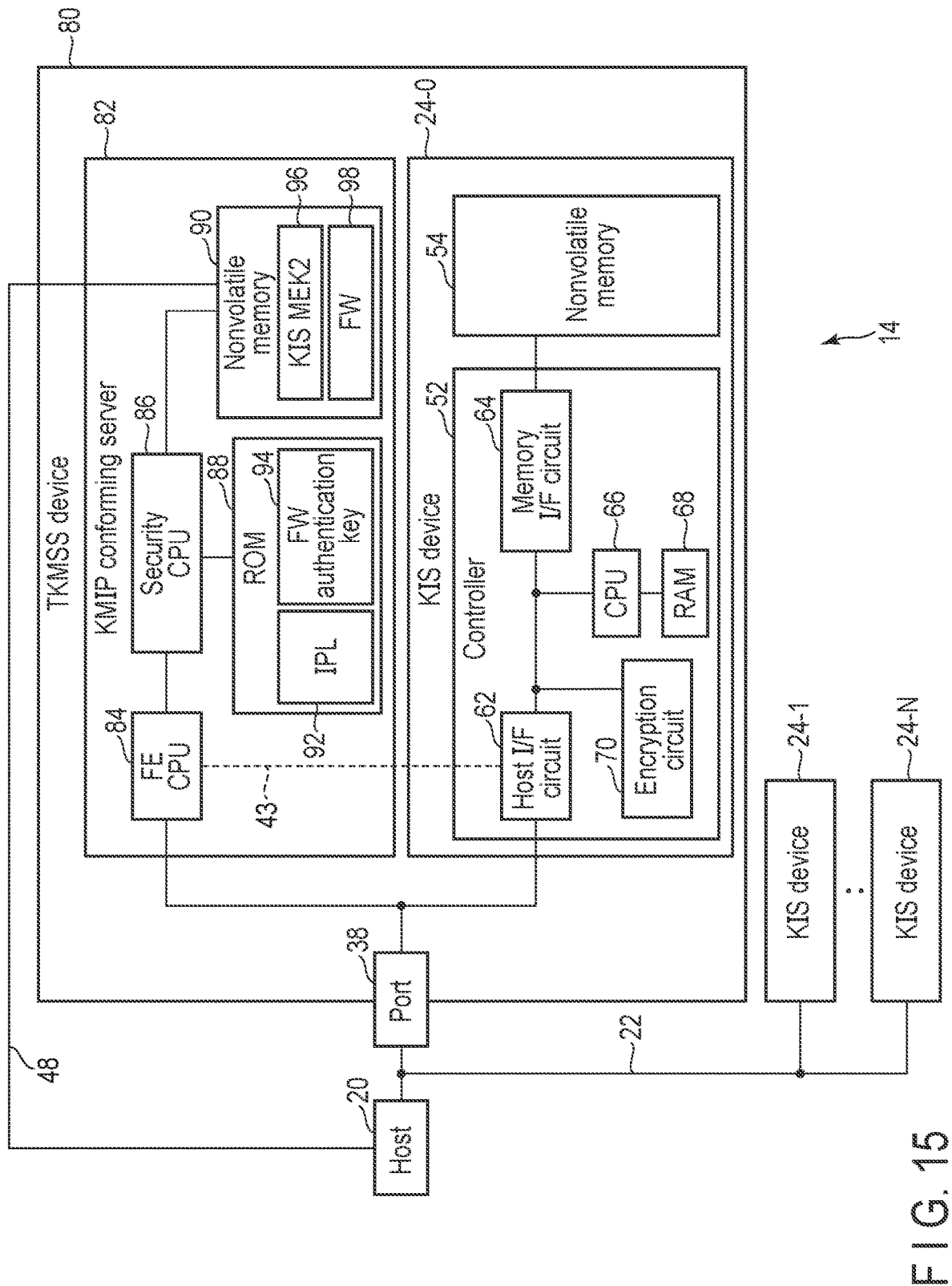
F I G. 15

KEY MANAGEMENT DEVICE AND STORAGE SYSTEM

CROSS-REFERENCE TO RELATED APPLICATIONS

This application is based upon and claims the benefit of priority from Japanese Patent Application No. 2020-154498, filed Sep. 15, 2020, the entire contents of which are incorporated herein by reference.

FIELD

Embodiments described herein relate generally to a key management device and a storage system.

BACKGROUND

Security of storage devices is achieved by, for example, encryption of data. Encryption may be performed by encrypting data outside the storage device and the encrypted data are supplied to the storage device, or by encrypting data inside the storage device. The storage device in the latter case is known as a self-encrypting drive device (SED device). Opal, which has been developed by Trusted Computing Group (TCG), is available as one of the standards related to the SED device.

The SED device stores an encryption key therein, which means if the SED device itself is stolen, the key is stolen together, and the encrypted data will be decrypted. This is vulnerability in the security.

BRIEF DESCRIPTION OF THE DRAWINGS

FIG. 3 is a sequence diagram of another example of division/allocation of the KMSS_MEK and the KIS_MEK, according to the first embodiment.

FIG. 6 illustrates an example of a hardware structure of the KMSS device, according to the first embodiment.

FIGS. 7A and 7B respectively illustrate examples of key encryption key (KEK) transmission, according to the first embodiment.

FIGS. 8A, 8B, 8C, and 8D respectively illustrate examples of an operation of the KMSS device, according to the first embodiment.

FIG. 11 illustrates another example of a hardware structure of the KMSS device, according to the first embodiment.

FIGS. 12A, 12B, 12C, and 12D respectively illustrate other examples of the operation of the KMSS device, according to the first embodiment.

FIG. 15 illustrates an example of a storage system including a key management device and a storage device, according to a second embodiment.

DETAILED DESCRIPTION

Figure 1:
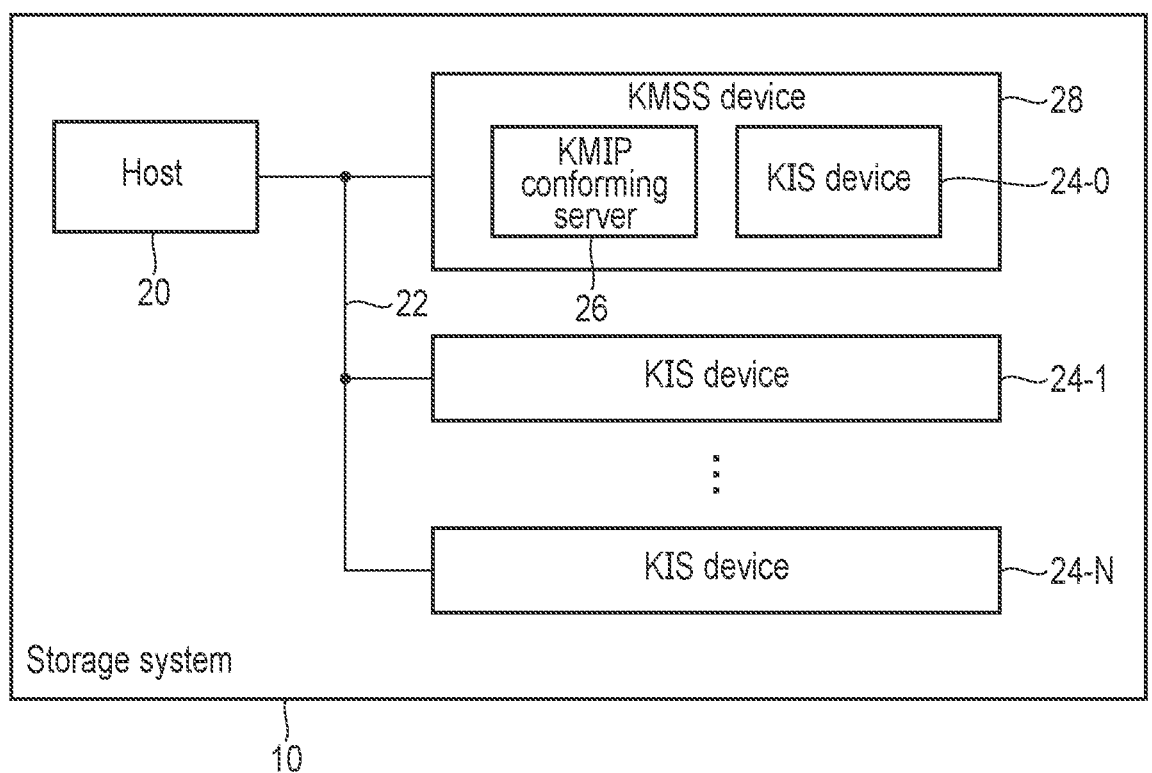
FIG. 1 illustrates an example of a storage system including a key management device and a storage device, according to a first embodiment.

Various embodiments will be described hereinafter with reference to the accompanying drawings.

The disclosure is merely an example and the present invention is not limited by contents described in the embodiments described below. Modification which is easily conceivable by a person of ordinary skill in the art comes within the scope of the invention as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like (or same) reference numerals and their detailed descriptions may be omitted unless necessary.

In general, according to one embodiment, a key management device connectable to a host, comprising a first storage device and a server. The first storage device includes a first port, a first nonvolatile memory, and a first controller. The first controller is configured to encrypt, using a first media encryption key, data transmitted from the host and received through the first port; and store the encrypted data in the first nonvolatile memory. The server includes: a second nonvolatile memory, the second nonvolatile memory storing a first key; and a second controller configured to transmit the first key from the second nonvolatile memory to the first storage device without passing through the host. The first controller of the first storage device is configured to generate the first media encryption key using the first key.

Initially, a self-encrypting drive device (SED device) will be summarized. The SED device is connectable to a host. The host writes data into the SED device and reads data from the SED device. The SED device encrypts data transmitted from the host using a media encryption key (MEK).

The MEK is derived from a personal identification number (PIN) of a legitimate user of the SED device. Thus, when the host reads data from the SED device, the host needs the PIN input by the user. When the legitimate user inputs the PIN, the SED device derives the MEK and decrypts the data, and thus, the host can read the data. When the PIN of the legitimate user is not input, the SED device cannot derive the MEK, and the host cannot read the data.

The MEK is a key per range. The range is a data area defined by the TCG standard. If the range is deleted by a user, the value of the MEK associated with the deleted range is updated.

Since the SED device can derive the MEK, if the SED device is stolen, and the PIN of the legitimate user is stolen, the encrypted data will be decrypted to be read.

The above problem is solvable when information required to derive the MEK is transmitted (in other words, inserted) to the SED device from an external key management system such that the SED device cannot derive the MEK from the PIN alone. The information required to derive the MEK may be regarded as a part of the MEK, and thus, in this specification, it will be referred to as a part of MEK. The SED device to which the part of MEK can be inserted from the external key management system will be referred to as a key insertable storage device (KIS device). A MEK used to encrypt data in the KIS device will be donated as a KIS_MEK.

The KIS device gives a part of the KIS_MEK to the key management system, and takes the part of the KIS_MEK from the key management system to derive the KIS_MEK. By applying access restriction to the key management system, even if the KIS device itself is stolen, an undesired read operation can be prevented.

Specifically, assume that a key derived from the PIN is called a KIS_MEK1 and a key given to the key management system is called a KIS_MEK2. In this case, the KIS device can derive the KIS_MEK only when the KIS_MEK1 and the KIS_MEK2 are set in the device. Multi-factor authentication is achievable by restricting, using client certificate or public key authentication, hosts that are accessible to the key management system. The hosts accessible to the key management system can read/write data from/to the KIS device only when a correct PIN is input.

Even if the KIS device itself is stolen, by discarding the KIS_MEK2 on the key management system by a legitimate user, the KIS device cannot derive the KIS_MEK anymore. Thus, the data can be substantially erased, and data leakage can be prevented. That is, discarding the KIS_MEK2 is equal to discarding reading means of user data.

However, the multi-factor authentication is not achievable if the KIS_MEK2 is intercepted in the process of insertion of the KIS_MEK2 from the key management system to the KIS device. Thus, the KIS device encrypts the KIS_MEK2 to be given to the key management system with a different key, which is called a key encryption key (KEK). The KEK is a key unique to each KIS device.

The KEK needs to be shared by both the key management system and the KIS device. Credibility of the KEK is the basis of credibility of the KIS device, and a possibility of forging the KEK must be eliminated.

As can be understood from the above, security of the KIS device is possibly strengthened as compared to a non-KIS device (i.e., SED devices other than the KIS device). This is because the multi-factor authentication is achievable by restricting insertion routes of the MEK from the key management system to the KIS device.

Requirements for the KIS device will be summarized as follows.

Firstly, safe share of the KEK is required. When a part of the MEK, which is to be given to an external key management system, is encrypted with the KEK, the KEK should be shared safely between the key management system and the KIS device. Even if another piece of secret information is used in the share of the KEK, a risk that the KEK cannot be shared safely is still remained. In addition, some methods, for example, a method of using a key exchange protocol with a public key encryption, use no secret information. However, such methods may possibly be vulnerable to a man-in-the-middle attack.

Secondly, a trustable key management system is required. There are several advantages in the method of managing the MEK outside the KIS device. However, in order to achieve the method, devices and communication channels to provide key manager functions are required in addition to the KIS device. In the method of managing the MEK outside the KIS device, leakage of the KEK, which is an encryption key of the MEK, from the external key management system is unacceptable. If key management is outsourced to a third party, credibility of the third party would be a problem. If the key management system is prepared by the users of the KIS device, the above problem will be solved but maintenance and operation costs are required.

The storage system of the embodiments, which will solve the aforementioned problems, will be explained.

First Embodiment

FIG. 1 illustrates an example of a storage system 10 including a key management device and a storage device, according to a first embodiment.

The storage system 10 includes a host 20 and a plurality of KIS devices 24-0, 24-1, . . . , and 24-N. At least one KIS device of the KIS devices 24-0 to 24-N, for example, KIS device 24-0 forms a key management service storage device (KMSS device) 28 together with a server conforming to a key management interoperability protocol (KMIP conforming server) 26. The KIS device 24-0 and the KMIP conforming server 26 may be formed of a single chip. If the KIS device 24-0 and the KMIP conforming server 26 are respectively realized with different chips, the KIS device 24-0 and the KMIP conforming server 26 may be mounted in a single package or on a single circuit board. Alternatively, the KIS device 24-0 and the KMIP conforming server 26 may be mounted in different packages or on different circuit boards.

The KMSS device 28 and the KIS devices 24-1 to 24-N are connected to the host 20 through a communication channel conforming to a predetermined interface, for example, PCIe™ bus 22.

The KMIP conforming server 26 performs derivation, storage, and transmission of an encryption key with respect to the KIS devices 24-0 to 24-N. The KMIP conforming server 26 verifies signature transmitted from the host 20.

The KMIP conforming server 26 directly transmits a KEK for the KIS device 24-0 to the KIS device 24-0 without passing the key through the PCIe bus 22. The KMIP conforming server 26 transmits KEKs for the KIS devices 24-1 to 24-N to the KIS devices 24-1 to 24-N through the PCIe bus 22. That is, the KMSS device 28 functions as a key management system with respect to the other KIS devices 24-1 to 24-N connected to the same host 20.

The KMSS device 28 and the KIS devices 24-1 to 24-N are connected to each other through the PCIe bus 22 in the storage system 10 without passing through an external network. Thus, the KEKs can be securely transmitted to the KIS devices 24-1 to 24-N from the KMSS device 28.

If the KMSS device 28 and the KIS devices 24-1 to 24-N are manufactured by the same vender, or if the KEKs can be shared between venders even when these devices 28 and 24-1 to 24-N are manufactured by different venders, the KEKs can be set to the KMSS device 28 and the KIS devices 24-1 to 24-N through a secured manufacturing process before shipment from the vender(s).

Further, managing at least a part of the MEK used in the KIS device 24-0 of the KMSS device 28 in the host 20 can achieve a secret sharing of the KMSS device 28. In the cryptography theory, methods for distributing a secret (e.g., a secret key) is called the secret sharing. Even if one of the distributed secret keys is leaked, data cannot be decrypted with the leaked key itself, and thus, information leakage can be prevented.

Distribution of the MEK in the KMSS device 28 will be explained.

The MEK used in the KIS device 24-0 of the KMSS device 28 will be denoted as a KMSS_MEK. For simplified explanation, the storage system 10 includes one KMSS device 28 and one KIS device 24-1 in this example.

In the KIS device 24-1, the KIS_MEK is divided into a KIS_MEK1 and a KIS_MEK2. The KIS_MEK1 is a key derived based on PIN. The KIS_MEK2 is deposited in the KMSS device 28 and is managed by the KMSS device 28. A user must succeed the multi-factor authentication to derive the KIS_MEK of the KIS device 24-1, and thus, improvement of security can be expected.

In the KMSS device 28, the KMSS_MEK is divided and the divided keys are allocated (or, stored) in the KMSS device 28 itself and the host 20, and thus the improvement of security can be expected. In this case, there are at least two possible methods of division and allocation of the KMSS_MEK between the KMSS device and the host 20.

Figure 2:
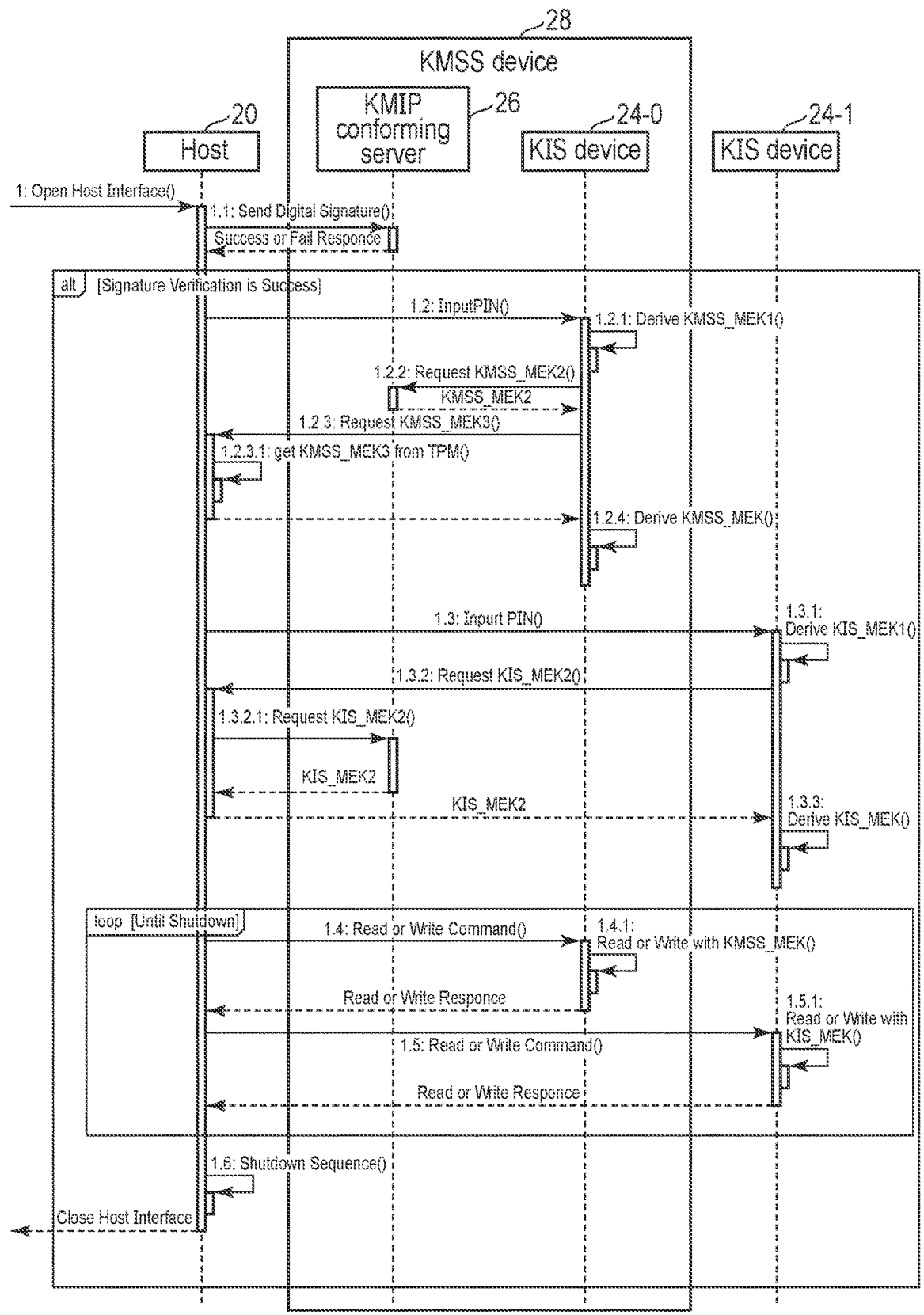
FIG. 2 is a sequence diagram of an example of division/allocation of a key management service storage-media encryption key (KMSS_MEK) and a key insertable storage-MEK (KIS_MEK), according to the first embodiment.

FIG. 2 is a sequence diagram of an example of the division/allocation of the KMSS_MEK and the KIS_MEK. In this example, the KMSS_MEK is divided into a KMSS_MEK1, a KMSS_MEK2, and a KMSS_MEK3. FIG. 2 illustrates an example where the management of the KMSS_MEK3 is performed by the host 20.

The KMSS_MEK1 is a key derived from the PIN of the user of the host 20. The KMSS_MEK2 is deposited in the KMIP conforming server 26 in the KMSS device 28 and is managed by the KMIP conforming server 26. The KMSS_MEK3 is generated and managed by a trusted platform module (TPM) of the host 20. The TPM is, for example, a high security chip conforming to the security standard of TCG. The KMSS device 28 authenticates the user of the host 20. If the user is successfully authenticated, the KMSS device 28 receives the KMSS_MEK3 from the host 20.

Specifically, as shown in FIG. 2, the host 20 requests the KMIP conforming server 26 to authenticate a digital signature (step 1.1).

If the authentication succeeds in the KMIP conforming server 26, the host 20 transmits the PIN, which has been input to the host 20, to the KIS device 24-0 (step 1.2). The KIS device 24-0 derives the KMSS_MEK1 from the PIN (step 1.2.1).

The KIS device 24-0 requests the KMSS_MEK2 to the KMIP conforming server 26 (step 1.2.2), and receives the KMSS_MEK2 from the KMIP conforming server 26.

The KIS device 24-0 requests the KMSS_MEK3 to the host 20 (step 1.2.3). The host 20 obtains the KMSS_MEK3 from the TPM (step 1.2.3.1), and transmits the KMSS_MEK3 to the KIS device 24-0.

The KIS device 24-0 derives the KMSS_MEK from the KMSS_MEK1, KMSS_MEK2, and KMSS_MEK3 (step 1.2.4).

The host 20 transmits the PIN, which has been input to the host 20, to the KIS device 24-1 (step 1.3). The KIS device 24-1 derives the KIS_MEK1 from the PIN (step 1.3.1). The KIS device 24-1 requests the KIS_MEK2 to the host 20 (step 1.3.2).

The host 20 requests the KIS_MEK2 to the KMIP conforming server 26 (step 1.3.2.1). The KMIP conforming server 26 obtains the KIS_MEK2 stored therein, and transmits the KIS_MEK2 to the host 20. The host 20 transmits the KIS_MEK2 to the KIS device 24-1.

The KIS device 24-1 derives the KIS_MEK from the KIS_MEK1 and the KIS_MEK2 (step 1.3.3).

The host 20 transmits a read command or a write command to the KIS device 24-0 (step 1.4). The KIS device 24-0 performs a read operation or a write operation using the KMSS_MEK (step 1.4.1). The KIS device 24-0 transmits a response for the read command or the write command to the host 20.

The host 20 transmits a read command or a write command to the KIS device 24-1 (step 1.5). The KIS device 24-1 performs a read operation or a write operation using the KIS_MEK (step 1.5.1). The KIS device 24-1 transmits a response for the read command or the write command to the host 20.

The above operation (step 1.4 and step 1.4.1, and step 1.5 and step 1.5.1) is continued until the storage system 10 is shutdown. When the storage system 10 is shutdown, the KIS_MEK is discarded from the KIS device 24-1 and the KMSS_MEK is discarded from the KIS device 24-0.

FIG. 3 is a sequence diagram of another example of the division/allocation of the KMSS_MEK and the KIS_MEK. In this example, PIN authentication of the KMSS device 28 is performed by the host 20. The KMSS_MEK is divided into the KMSS_MEK1 and the KMSS_MEK2.

The host 20 performs the PIN authentication for the KMSS device 28 and derivation of the KMSS_MEK1. The host 20 adds a digital signature to the KMSS_MEK1 and transmits the KMSS_MEK1 to the KMSS device 28. The KMSS device 28 authenticates the received signature, and checks authenticity of the KMSS_MEK1. If the authenticity is verified, the KMSS device 28 derives the KMSS_MEK by combining the KMSS_MEK1 and the KMSS_MEK2 stored therein.

Specifically, as shown in FIG. 3, when the PIN is input to the host 20 (step 1.1), the host 20 derives the KMSS_MEK1 from the PIN (step 1.1.1). The host 20 adds the digital signature to the KMSS_MEK1 to request authentication of the digital signature to the KMIP conforming server 26, and transmits the KMSS_MEK1 to the KMIP conforming server 26 (step 1.2).

If the authentication succeeds in the KMIP conforming server 26 (step 1.2.1), the KMIP conforming server 26 transmits the KMSS_MEK1 and the KMSS_MEK2 to the KIS device 24-0 (step 1.2.2). The KIS device 24-0 derives the KMSS_MEK from the KMSS_MEK1 and the KMSS_MEK2 (step 1.2.2.1).

The host 20 transmits the PIN, which has been input to the host 20, to the KIS device 24-1 (step 1.3). The KIS device 24-1 derives the KIS_MEK1 from the PIN (step 1.3.1). The KIS device 24-1 requests the KIS_MEK2 to the host 20 (step 1.3.2).

The host 20 requests the KIS_MEK2 to the KMIP conforming server 26 (step 1.3.2.1). The KMIP conforming server 26 obtains the KIS_MEK2 stored therein, and transmits the KIS_MEK2 to the host 20. The host 20 transmits the KIS_MEK2 to the KIS device 24-1. The KIS device 24-1 derives the KIS_MEK from the KIS_MEK1 and the KIS_MEK2 (step 1.3.3).

The host 20 transmits a read command or a write command to the KIS device 24-0 (step 1.4). The KIS device 24-0 performs a read operation or a write operation using the KMSS_MEK (step 1.4.1). The KIS device 24-0 transmits a response for the read command or the write command to the host 20.

The host 20 transmits a read command or a write command to the KIS device 24-1 (step 1.5). The KIS device 24-1 performs a read operation or a write operation using the KIS_MEK (step 1.5.1). The KIS device 24-1 transmits a response for the read command or the write command to the host 20.

The above operation (step 1.4 and step 1.4.1, and step 1.5 and step 1.5.1) is continued until the storage system 10 is shutdown. When the storage system 10 is shutdown, the KIS_MEK is discarded from the KIS device 24-1 and the KMSS_MEK is discarded from the KIS device 24-0.

In the examples of FIGS. 2 and 3, the KMIP conforming server 26, which verifies the signature of the host 20, needs to maintain a public key of a legitimate host in advance. There are at least two possible methods to have the KMSS device 28 (KMIP conforming server 26) maintain the public key of the legitimate host.

Figure 4:
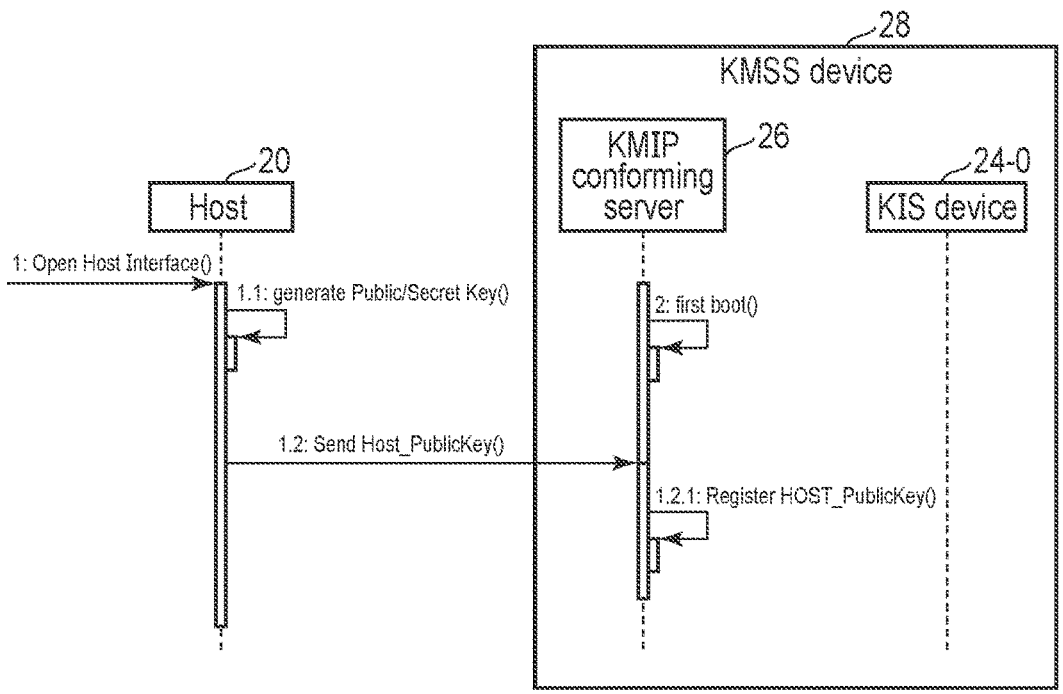
FIG. 4 is a sequence diagram of an example of a first method to have a KMSS device maintain a public key of a legitimate host, according to the first embodiment.

FIG. 4 is a sequence diagram of an example of a first method to have the KMSS device 28 maintain the public key of the legitimate host. In the first method, it is assumed that the first boot of the KMSS device 28 is performed by a legitimate user. The KMSS device 28 trusts the host 20 connected in the first boot time as the host of the legitimate user, and accepts the public key from the host 20.

Specifically, as shown in FIG. 4, the host 20 generates a pair of a public key and a secret key (step 1.1). After the KMIP conforming server 26 performs the first boot (step 2), the host 20 transmits the public key of the host 20 to the KMIP conforming server 26 (step 1.2). In step 1.2.1, the KMIP conforming server 26 registers the public key from the host 20 in an internal memory (not shown).

Figure 5:
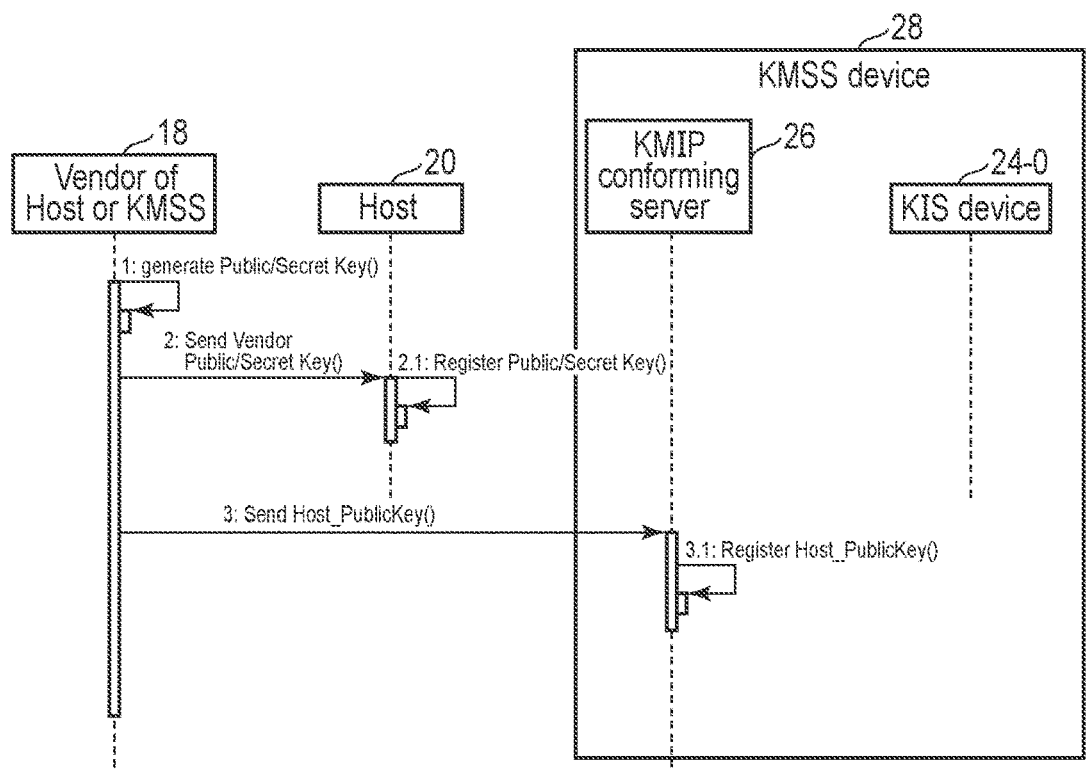
FIG. 5 is a sequence diagram of an example of a second method to have the KMSS device maintain the public key of the legitimate host, according to the first embodiment.

FIG. 5 is a sequence diagram of an example of a second method to have the KMSS device 28 maintain the public key of the legitimate host. In the second method, a vendor of the host 20 or a vendor of the KMSS device 28 registers a public key of the host 20 in the KMSS device 28 before shipment.

Specifically, as shown in FIG. 5, the vendor 18 of the host 20 or the KMSS device 28 generates a pair of a public key and a secret key (step 1). The vendor 18 of the host 20 or the KMSS device 28 transmits the public key and the secret key to the host 20 (step 2). Then in step 2.1, the host 20 registers the public key and the secret key in an internal memory (not shown).

The vendor 18 of the host 20 or the KMSS device 28 transmits the public key of the host 20 to the KMIP conforming server 26 (step 3). Then in step 3.1, the KMIP conforming server 26 registers the public key of the host 20 in an interval memory (not shown).

Now, an example of a method of distributing keys to the KIS devices 24-1 to 24-N and the host 20 by the KMSS device 28 will be explained.

FIG. 6 illustrates an example of a hardware structure of the KMSS device 28 which includes a plurality of ports (also referred to as terminals) 32 and 34 for communicating with the host 20. FIGS. 7A and 7B respectively illustrate examples of KEK transmission, according to the first embodiment.

FIGS. 8A to 8D respectively illustrate examples of the operation of the KMSS device 28.

The KIS device 24-0 includes a nonvolatile memory 54 and a controller 52 (the same applies to the KIS devices 24-1 to 24-N).

The controller 52 controls a read/write operation of the nonvolatile memory 54. The controller 52 includes a host interface (I/F) circuit 62, a memory I/F circuit 64, a central processing unit (CPU) 66, a random access memory (RAM) 68, and an encryption circuit 70.

The host I/F circuit 62 is connected to a communication channel conforming to a predetermined interface, for example, PCIe bus 22 through the first port 32.

The memory I/F circuit 64 is connected to the nonvolatile memory 54. The nonvolatile memory 54 may be a NAND flash memory.

The RAM 68 temporarily stores data to be written to the nonvolatile memory 54, data read from the nonvolatile memory 54, and management data of the nonvolatile memory 54 such as a logical to physical address conversion table.

The encryption circuit 70 encrypts the data to be written to the nonvolatile memory 54 and decrypts the encrypted data read from the nonvolatile memory 54.

The KMIP conforming server 26 includes a front end (FE) CPU 42 and a memory 46 for storing encryption keys. The memory 46 is a nonvolatile memory.

The FE CPU 42 is connected to the PCIe bus 22 through the second port 34. The KMIP conforming server 26 and the KIS device 24-0, i.e., the FE CPU 42 and the host I/F circuit 62 are connected through a second communication channel 43. The FE CPU 42 receives a command sent from the host I/F circuit 62 of the KIS device 24-0.

In response to the command, the FE CPU 42 performs derivation, storage, and transmission of the encryption keys with respect to the KIS devices 24-0 to 24-N.

The KMIP conforming server 26 transmits the encryption key to the host 20 through a third communication channel 48 other than the PCIe bus 22.

The KIS device 24-0 is connected to the first port 32. The first port 32 is connected to the host 20 through the PCIe bus 22. The KMIP conforming server 26 is connected to the second port 34. The second port 34 is connected to the host 20 through the PCIe bus 22.

In the KMSS device 28, the KMIP conforming server 26 is connected to the KIS device 24-0 through the second port 34, the PCIe bus 22, and the first port 32. The KMIP conforming server 26 (FE CPU 42) is also connected to the KIS device 24-0 (host I/F circuit 62) through the second communication channel 43 without passing through the second port 34, the PCIe bus 22, and the first port 32.

As shown in FIGS. 7A and 7B, the KMIP conforming server 26 transmits KEKs to the KIS device 24-0 to 24-N. For the KIS device 24-0, as shown in FIG. 7A, in step S102, the KMIP conforming server 26 determines whether the KIS device 24-0 is first booted. If the KIS device 24-0 is first booted (YES in S102), in step S104, the KMIP conforming server 26 transmits a KEK to the KIS device 24-0 through the second communication channel 43. In manufacturing of the KMSS device 28, the KEK is written into the memory 46 of the KMIP conforming server 26. At this time, the KEK may be transmitted to the KIS device 24-0 through the second communication channel 43.

As shown in FIG. 7B, in step S112, the KMIP conforming server 26 determines whether one of KIS devices 24-1 to 24-N is first booted. If one of the KIS devices 24-1 to 24-N is first booted (YES in S112), in step S114, the KMIP conforming server 26 transmits a KEK to the one of the first booted KIS devices 24-1 to 24-N through the second port 34, PCIe bus 22, and first port 32.

As shown in FIG. 8A, the KMSS device 28 (KIS device 24-0) connected to the host 20 through the first port 32 functions as one of the KIS devices with respect to the host 20.

As shown in FIG. 8B, the KMSS device 28 (KMIP conforming server 26) connected to the host 20 through the second port 34 functions as a key management system with respect to the KIS devices 24-1 to 24-N.

As shown in FIG. 8C, the KMIP conforming server 26 as the key management system authenticates a user of the host 20. If the authentication succeeds, the KMIP conforming server 26 transmits the KIS_MEK2, which is stored in the memory 46, to the host 20 through the third communication channel 48. The third communication channel 48 directly connects the KMIP conforming server 26 and the host 20. Thus, intercept of the KIS_MEK2 can be prevented. Note that the KMIP conforming server 26 may transmit the KIS_MEK2 through the PCIe bus 22 via the second port 34.

As shown in FIG. 8D, the host 20 transmits the KIS_MEK2 to the KIS device 24-1 through the PCIe bus 22. At that time, the transmitted KIS_MEK2 does not pass through a communication channel (for example, network line) other than the PCIe bus 22 between the host 20 and the KIS device 24-1. Thus, intercept of the KIS_MEK2 can be prevented.

Note that when the KIS_MEK2 is transmitted from the KMIP conforming server 26 to the KIS device 24-1 through the host 20, it may or may not pass a CPU or a main memory device of the host 20.

The first port 32 and the second port 34 are connected to the host 20 through the communication channels conforming to the same interface, in this example, PCIe bus 22. However, the first port 32 and the second port 34 may be connected to the host 20 through communication channels conforming to different interfaces.

For example, the first port 32 may be connected to the host 20 through the PCIe bus 22, and the second port 34 may be connected to the host 20 through an Ethernet™ cable. In this case, the KMSS device 28 may function as the KIS device 24-0 if being connected to the host 20 through the PCIe bus 22. The KMSS device 28 may function as the KMIP conforming server 26 if being connected to the host 20 through the Ethernet cable.

Figure 9:
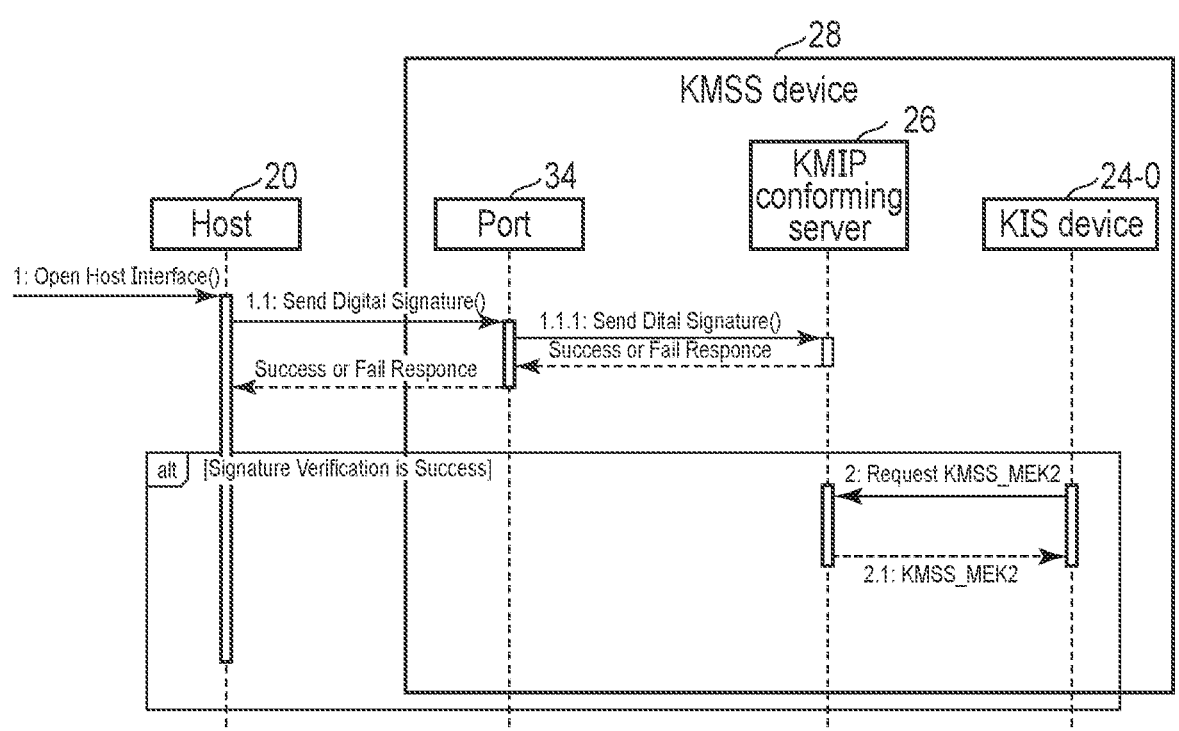
FIG. 9 is a sequence diagram of an example of division/allocation of the KMSS_MEK, according to the first embodiment.

FIG. 9 is a sequence diagram of an example of the division/allocation of the KMSS_MEK in the configuration illustrated in FIG. 6.

The host 20 requests authentication of a digital signature to the KMIP conforming server 26 through the second port 34 (step 1.1 and step 1.1.1).

After the authentication succeeds in the KMIP conforming server 26, the KIS device 24-0 requests the KMSS_MEK2 to the KMIP conforming server 26 through the second communication channel 43 (step 2).

The KMIP conforming server 26 transmits the KMSS_MEK2, which is stored in the memory 46, to the KIS device 24-0 through the second communication channel 43 (step 2.1).

Figure 10:
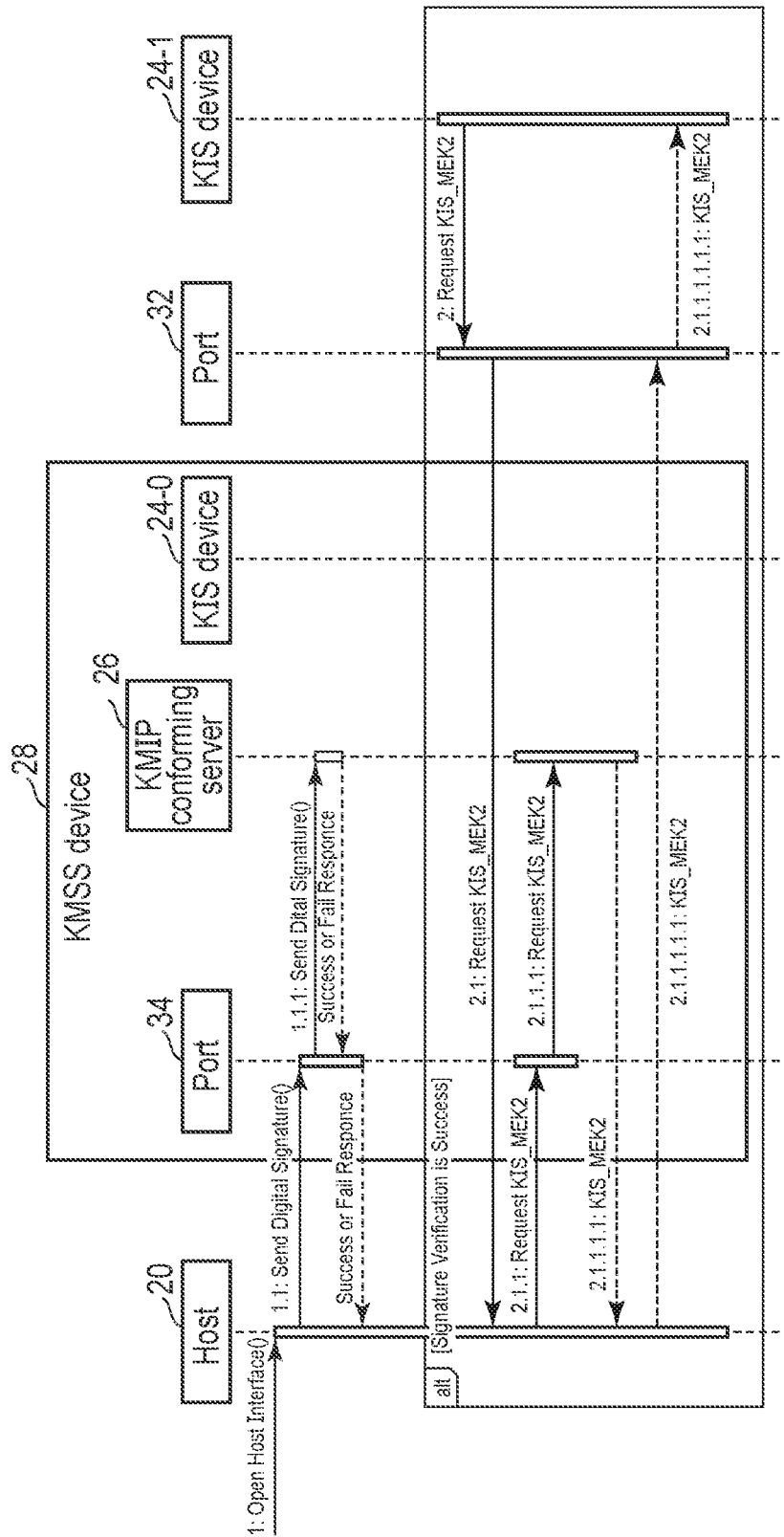
FIG. 10 is a sequence diagram of an example of division/allocation of the KIS_MEK, according to the first embodiment.

FIG. 10 is a sequence diagram of an example of the division/allocation of the KIS_MEK in the configuration illustrated in FIG. 6.

The host 20 requests authentication of a digital signature to the KMIP conforming server 26 through the second port 34 (step 1.1 and step 1.1.1).

After the authentication succeeds in the KMIP conforming server 26, the KIS device 24-1 requests the KIS_MEK2 to the host 20 through the first port 32 of the KIS device 24-1 (step 2 and step 2.1). The host 20 requests the KIS_MEK2 to the KMIP conforming server 26 through the second port 34 (step 2.1.1 and step 2.1.1.1).

The KMIP conforming server 26 transmits the KIS_MEK2, which is stored in the memory 46, to the host 20 through the third communication channel 48 (step 2.1.1.1.1). Note that the KMIP conforming server 26 may transmit the KIS_MEK2 through the PCIe bus 22 via the second port 34. The host 20 transmits the KIS_MEK2 to the KIS device 24-1 through the first port 32 (step 2.1.1.1.1.1 and step 2.1.1.1.1.1.1).

FIG. 10 illustrate an example in which the KIS_MEK2 is transmitted from the KMIP conforming server 26 to the KIS device 24-1. The method illustrated in FIG. 10, however, may be applied to a case in which the KMSS_MEK2 is transmitted from the KMIP conforming server 26 to the KIS device 24-0.

That is, the KIS device 24-0 may request the KMSS_MEK2 to the host 20 through the first port 32 of the KIS device 24-0. The host 20 then may request the KIS_MEK2 to the KMIP conforming server 26 through the second port 34.

The KMIP conforming server 26 may transmit the KMSS_MEK2, which is stored in the memory 46, to the host 20 through the third communication channel 48. Note that the KMIP conforming server 26 may transmit the KMSS_MEK2 through the PCIe bus 22 via the second port 34. The host 20 may transmit the KMSS_MEK2 to the KIS device 24-0 through the first port 32.

FIG. 10 illustrates an example in which the host 20 participates in transmission of the KIS_MEK2 to the KIS device 24-1 (or the KMSS_MEK2 to the KIS device 24-0) from the KMIP conforming server 26. However, the host 20 may not participate in transmission of the key. For example, the KMIP conforming server 26 may transmit the KIS_MEK2 to the KIS device 24-1 (or the KMSS_MEK2 to the KIS device 24-0) through the PCIe bus 22 but not through the host 20.

FIG. 11 illustrates another example of the hardware structure of the KMSS device 28 which includes a single port 36, which is equivalent to the first port 32 illustrated in FIG. 6, for communicating with the host 20. Note that the KIS devices 24-1 to 24-N each include the first port 32 as illustrated in FIG. 6. FIGS. 12A to 12D respectively illustrate examples of the operation of the KMSS device 28.

The KMIP conforming server 26 and the KIS device 24-0 of the KMSS device 28 are structured the same as those of FIG. 6. FIG. 11 is different from FIG. 6 in that both the KMIP conforming server 26 and the KIS device 24-0 are connected to the port 36. The port 36 is connected to the host 20 through the PCIe bus 22.

As shown in FIG. 12A, the KMSS device 28 (KIS device 24-0) functions as one of the KIS devices with respect to the host 20.

As shown in FIG. 12B, the KMSS device 28 (KMIP conforming server 26) functions as a key management server with respect to the KIS devices 24-1 to 24-N.

As shown in FIG. 12C, the KMIP conforming server 26 as the key management system authenticates a user of the host 20. If the authentication succeeds, the KMIP conforming server 26 transmits the KIS_MEK2, which is stored in the memory 46, to the host 20 through the port 36 and the PCIe bus 22.

As shown in FIG. 12D, the host 20 transmits the KIS_MEK2 to the KIS device 24-1 through the PCIe bus 22. At that time, the KIS_MEK2 does not pass through a communication channel (for example, network line) other than the PCIe bus 22 between the host 20 and the KIS device 24-1. Thus, intercept of the KIS_MEK2 can be prevented.

Since the KIS device 24-0 and the KMIP conforming server 26 of the KMSS device 28 are physically integrated, a trustable key management system formed of minimum components can be achieved.

Note that when the KIS_MEK2 is transmitted from the KMIP confirming server 26 to the KIS device 24-1 through the host 20, it may or may not pass the CPU or the main memory device of the host 20.

Figure 13:
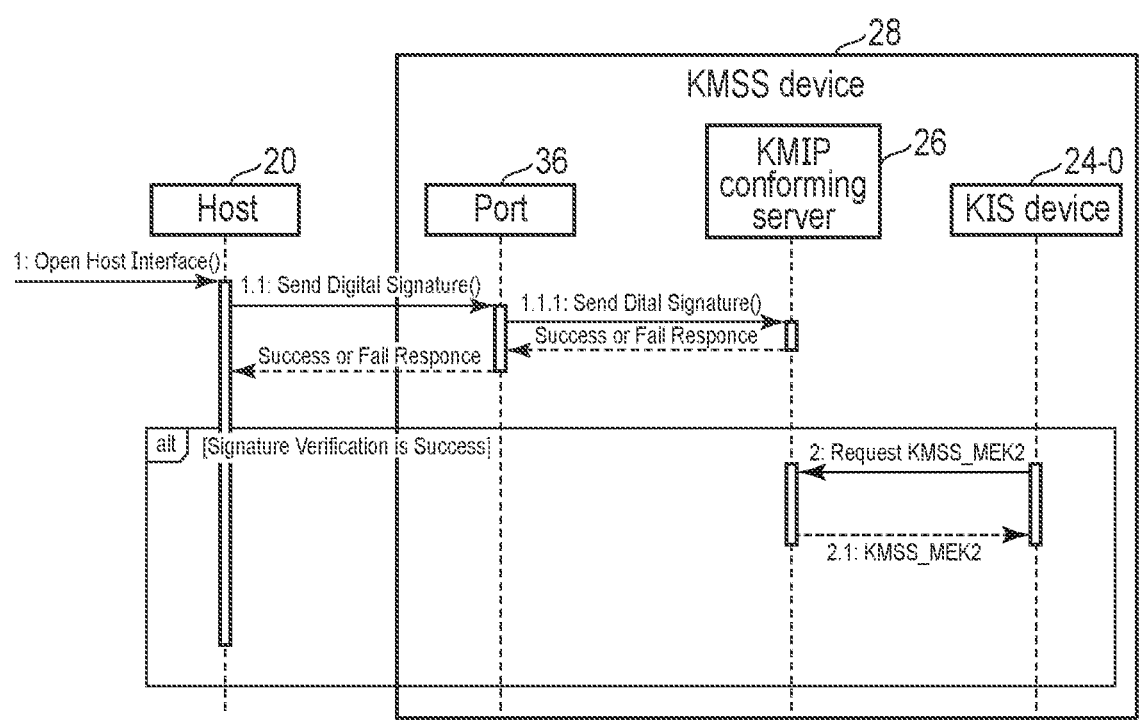
FIG. 13 is a sequence diagram of another example of division/allocation of the KMSS_MEK, according to the first embodiment.

FIG. 13 is a sequence diagram of an example of the division/allocation of the KMSS_MEK in the configuration illustrated in FIG. 11.

The host 20 requests authentication of a digital signature to the KMIP conforming server 26 through the port 36 (step 1.1 and step 1.1.1).

After the authentication succeeds in the KMIP conforming server 26, the KIS device 24-0 requests the KMSS_MEK2 to the KMIP conforming server 26 through the second communication channel 43 (step 2).

The KMIP conforming server 26 transmits the KMSS_MEK2, which is stored in the memory 46, to the KIS device 24-0 through the second communication channel 43 (step 2.1).

Figure 14:
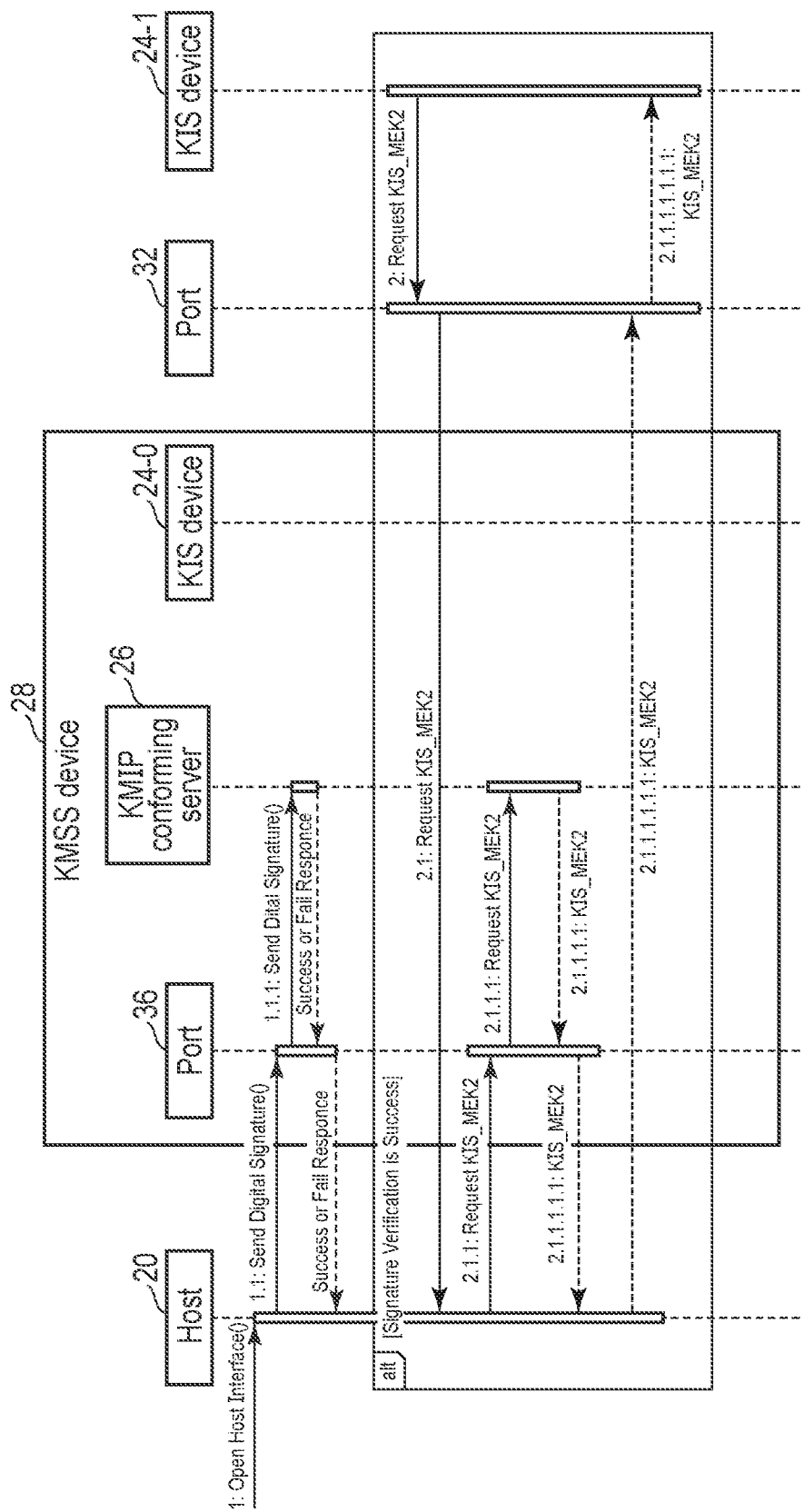
FIG. 14 is a sequence diagram of another example of division/allocation of the KIS_MEK, according to the first embodiment.

FIG. 14 is a sequence diagram of an example of the division/allocation of the KIS_MEK in the configuration illustrated in FIG. 11.

The host 20 requests authentication of a digital signature to the KMIP conforming server 26 through the port 36 (step 1.1 and step 1.1.1).

After the authentication succeeds in the KMIP conforming server 26, the KIS device 24-1 requests the KIS_MEK2 to the host 20 through the first port 32 of the KIS device 24-1 (step 2 and step 2.1). The host 20 requests the KIS_MEK2 to the KMIP conforming server 26 through the port 36 (step 2.1.1 and step 2.1.1.1).

The KMIP conforming server 26 transmits the KIS_MEK2, which is stored in the memory 46, to the host 20 through the port 36 (step 2.1.1.1.1 and step 2.1.1.1.1.1). The host 20 transmits the KIS_MEK2 to the KIS device 24-1 through the first port 32 of the KIS device 24-1 (step 2.1.1.1.1.1.1 and step 2.1.1.1.1.1.1.1).

FIG. 14 illustrate an example in which the KIS_MEK2 is transmitted from the KMIP conforming server 26 to the KIS device 24-1. The method illustrated in FIG. 14, however, may be applied to a case in which the KMSS_MEK2 is transmitted from the KMIP conforming server 26 to the KIS device 24-0, as the method illustrated in FIG. 10 may be applied.

FIG. 14 illustrates an example in which the host 20 participates in transmission of the KIS_MEK2 to the KIS device 24-1 (or the KMSS_MEK2 to the KIS device 24-0) from the KMIP conforming server 26. However, the host 20 may not participate in transmission of the key. For example, the KMIP conforming server 26 may transmit the KIS_MEK2 to the KIS device 24-1 (or the KMSS_MEK2 to the KIS device 24-0) through the PCIe bus 22 but not through the host 20.

As explained above, in the first embodiment, the KMIP conforming server 26 directly transmits the KEK for the KIS device 24-0 to the KIS device 24-0 without passing the KEK through the PCIe bus 22. The KMIP conforming server 26 transmits the KEKs for the KIS devices 24-1 to 24-N to the KIS devices 24-1 to 24-N through the PCIe bus 22. The KMSS device 28 and the KIS devices 24-1 to 24-N are connected through the PCIe bus 22 in the storage system 10, and are not connected through an external network. Therefore, the KEK can be securely transmitted to the KIS devices 24-1 to 24-N from the KMSS device 28.

The KIS device 24-0 and the KMIP conforming server 26 of the KMSS device 28 may be physically integrated, and thus, a trustable key management system formed of minimum components can be achieved.

Second Embodiment

FIG. 15 illustrates an example of a storage system including a key management device and a storage device, according to a second embodiment.

The storage system 14 includes the host 20 and a plurality of the KIS devices 24-0, 24-1, . . . , and 24-N. At least one KIS device of the KIS devices 24-0 to 24-N, for example, the KIS device 24-0 forms a temper-resistant key management service storage device (TKMSS device) 80 together with a server conforming to a key management interoperability protocol (KMIP conforming server) 82.

The TKMSS device 80 and the KIS devices 24-1 to 24-N are connected to the host 20 through the PCIe bus 22. The KMIP conforming server 82 and the KIS device 24-0 are connected to the PCIe bus 22 through a single port 38. However, like that shown in FIG. 6, the KMIP conforming server 82 and the KIS device 24-0 may be connected to the PCIe bus 22 through a plurality of ports.

The KMIP conforming server 82 includes a FE CPU 84, a security CPU 86, a ROM 88, and a nonvolatile memory 90. The KMIP conforming server 82 performs derivation, storage, and transmission of encryption keys with respect to the KIS devices 24-0 to 24-N. The KMIP conforming server 82 performs verification of a signature transmitted from the host 20.

The ROM 88 is, for example, a nonvolatile memory which is non-rewritable such as a mask ROM, or an e-fuse. The ROM 88 stores an initial program loader (IPL) 92, and a firmware (FW) authentication key 94. The FW authentication key 94 may be called a secret key, or a root key.

Instead of storing the FW authentication key 94 in the ROM 88 in advance, the FW authentication key 94 may be generated using a function, which generates a value unique to the device, such as a physically unclonable function (PUF). The FW authentication key 94 stored in the ROM 88 or generated by the PUF is protected by the hardware structure such that only the security CPU 86 can refer to.

The nonvolatile memory 90 is a rewritable nonvolatile memory such as a NAND flash memory. The nonvolatile memory 90 stores a KIS_MEK2 96 and main firmware (FW) 98 of the security CPU 86.

At a boot up of the TKMSS device 80, until a digital signature of the host 20 is authenticated, a region of the nonvolatile memory 90 in which the KIS_MEK2 96 is stored is locked, that is, the security CPU 86 does not allow the KIS_MEK2 96 to be read.

The FE CPU 84 performs verification of the signature transmitted from the host 20. The security CPU 86 is connected to the FE CPU 84 alone, and accepts (in other words, executes) only a template command. Thus, since the security CPU 86 does not accept other commands than the template command, the KMIP conforming server 82 can prevent tampering and intercept of the encryption key by an invalid operation from outside of the KMIP confirming server 82.

As explained, an access channel from the outside to the KMIP conforming server 82 is limited to the FE CPU 84, a command channel to the security CPU 86 is limited to the FE CPU 84, and a module which can directly perform key management is limited to the security CPU 86. Therefore, a risk of leakage and tampering of the encryption key in the KMIP conforming server 82 can be lowered.

Figure 16:
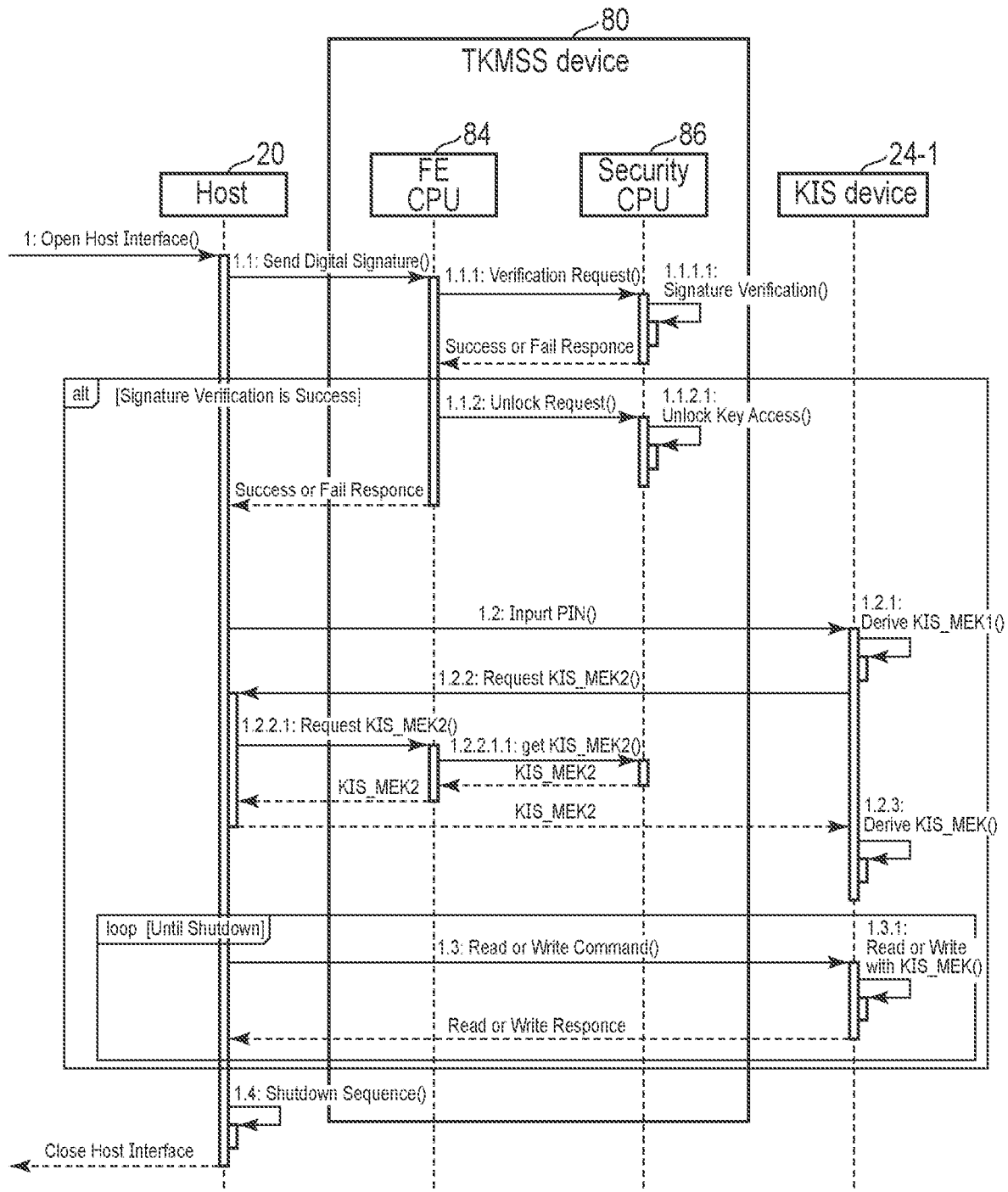
FIG. 16 is a sequence diagram of an example of transmission of a key, according to the second embodiment.

The KIS device 24-0 and the KMIP conforming server 82 may be formed of a single chip. If the KIS device 24-0 and the KMIP conforming server 82 are respectively realized with different chips, the KIS device 24-0 and the KMIP conforming server 82 may be mounted in the same package, or may be mounted in different packages. FIG. 16 is a sequence diagram of an example of the operation of the storage system, according to the second embodiment.

The host 20 transmits a digital signature to the FE CPU 84 (step 1.1). The FE CPU 84 requests authentication to the security CPU 86 (step 1.1.1). The security CPU 86 performs authentication of the digital signature using the FW authentication key 94 (step 1.1.1.1).

If the authentication succeeds in the security CPU 86, the FE CPU 84 requests unlock of the nonvolatile memory 90 to the security CPU 86 (step 1.1.2). The security CPU 86 unlocks access to the region of the nonvolatile memory 90 in which the KIS_MEK2 96 is stored (step 1.1.2.1). The FE CPU 84 transmits a response indicative of success or failure of the unlock to the host 20.

The host 20 transmits the PIN, which has been input to the host 20, to the KIS device 24-1 (step 1.2). The KIS device 24-1 derives a KIS_MEK1 from the PIN (step 1.2.1). The KIS device 24-1 requests the KIS_MEK2 96 to the host 20 (step 1.2.2).

The host 20 requests the KIS_MEK2 96 to the FE CPU 84 (step 1.2.2.1). The FE CPU 84 requests the KIS_MEK2 96 to the security CPU 86 (step 1.2.2.1.1). The security CPU 86 obtains the KIS_MEK2 96 from the unlocked region of the nonvolatile memory 90, and transmits the KIS_MEK2 96 to the host 20. The host 20 transmits the KIS_MEK2 to the KIS device 24-1.

The KIS device 24-1 derives a KIS_MEK from the KIS_MEK1 and the KIS_MEK2 (step 1.2.3).

The host 20 transmits a read command or a write command to the KIS device 24-1 (step 1.3). The KIS device 24-1 performs a read operation or a write operation using the KIS_MEK (step 1.3.1). The KIS device 24-1 transmits a response for the read command or the write command to the host 20.

As explained, the access channel to the KMIP conforming server 82 from the outside is limited to the FE CPU 84, the command channel to the security CPU 86 is limited to the FE CPU 84, and a module which can directly perform key management is limited to the security CPU 86. Therefore, a risk of leakage and tampering of the encryption key in the KMIP conforming server 82 can be lowered.

Figure 17:
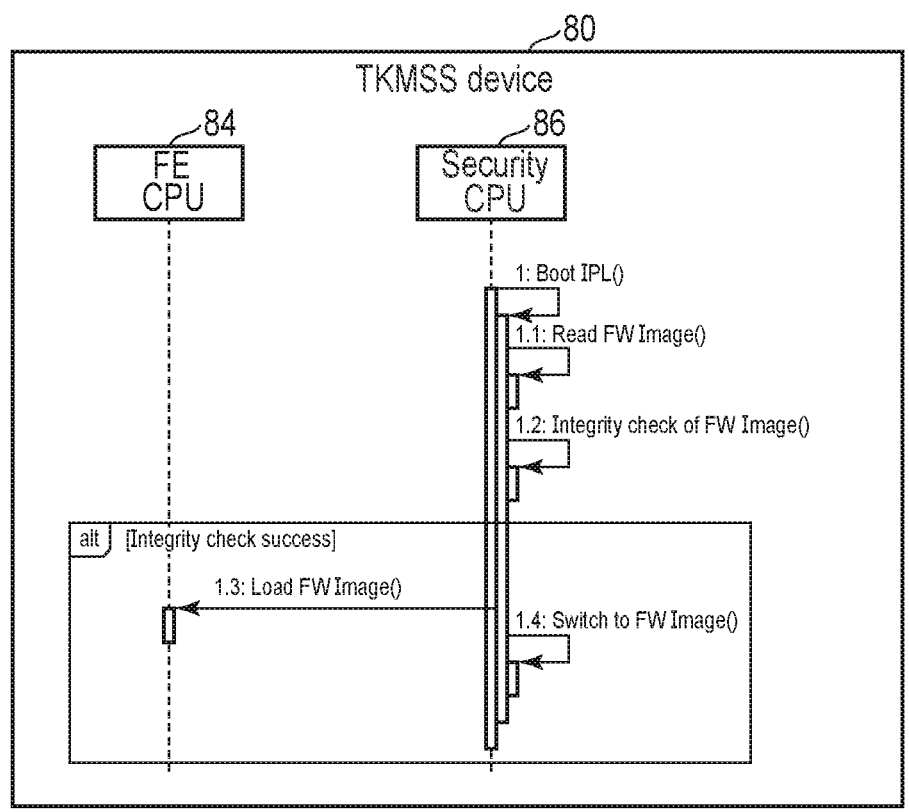
FIG. 17 is a sequence diagram of an example of detection of tampering of firmware in a temper-resistant key management service storage (TKMSS) device, according to the second embodiment.

Process to detect tampering of FW in the TKMSS device 80 will be explained. FIG. 17 illustrates an example of a boot sequence of the TKMSS device 80.

In the TKMSS device 80, the security CPU 86 initially boots up. The security CPU 86 reads, at the boot time, the IPL 92 stored in the ROM 88 (step 1). The security CPU 86 executing the IPL 92 reads the FW 98 of the security CPU 86 from the nonvolatile memory 90 (step 1.1). Optionally, the security CPU 86 executing the IPL 92 may read the FW of the FE CPU 84. The security CPU 86 verifies a digital signature or a message authentication code applied to the read FW using the FW authentication key 94, and checks integrity (step 1.2).

If the verification succeeds, the security CPU 86 loads the read FW to the FE CPU 84 to be executed (step 1.3). The security CPU 86 then changes its FW to be executed from the IPL 92 to the FW 98 (step 1.4).

In contrast, if the verification fails, the FW may have possibly been tampered, and is not loaded or executed. Thus, loading of tampered FW to the TKMSS device 80, and leakage of the encryption key with which a third party reads data can be prevented.

The FW 98 of the security CPU 86 (and the FW of the FE CPU 84) may be written in a non-rewritable memory such as a mask ROM instead of the nonvolatile memory 90. Alternatively, the area of the nonvolatile memory 90 into which the FW 98 is written in the manufacturing process may be set as a non-rewritable area. With any of these measures, writing of invalid FW by a user with a malicious intent (tampering) can be prevented.

Now, data protection, for example, prevention of intercept, of the KIS devices 24-1 to 24-N will be explained.

The TKMSS device 80 retains KEKs of KIS devices 24-1 to 24-N connected thereto, and shares the KEKs with the KIS devices 24-1 to 24-N respectively. In this example, the TKMSS device 80 and two KIS devices 24-1 and 24-2 are connected to the host 20.

The KIS devices 24-1 and 24-2 respectively deposit a KIS_MEK2-1 and a KIS_MEK2-2 to the TKMSS device 80. At that time, the TKMSS device 80 generates a KEK-1 to be shared with the KIS device 24-1. Similarly, the TKMSS device 80 generates a KEK-2 to be shared with the KIS device 24-2.

The security CPU 86 encrypts the KIS_MEK2-1 with the KEK-1 to be transmitted to the KIS device 24-1. Thus, the security CPU 86 can transmit the KIS_MEK2-1 to the KIS device 24-1 while maintaining the secrecy of the KIS_MEK2-1 to other devices such as the FE CPU 84, the host 20, and the KIS device 24-2.

Similarly, the security CPU 86 encrypts the KIS_MEK2-2 with the KEK-2 to be transmitted to the KIS device 24-2. Thus, the security CPU 86 can transmit the KIS_MEK2-2 to the KIS device 24-2 while maintaining the secrecy of the KIS_MEK2-2 to other devices such as the FE CPU 84, the host 20, and the KIS device 24-1.

Figure 18:
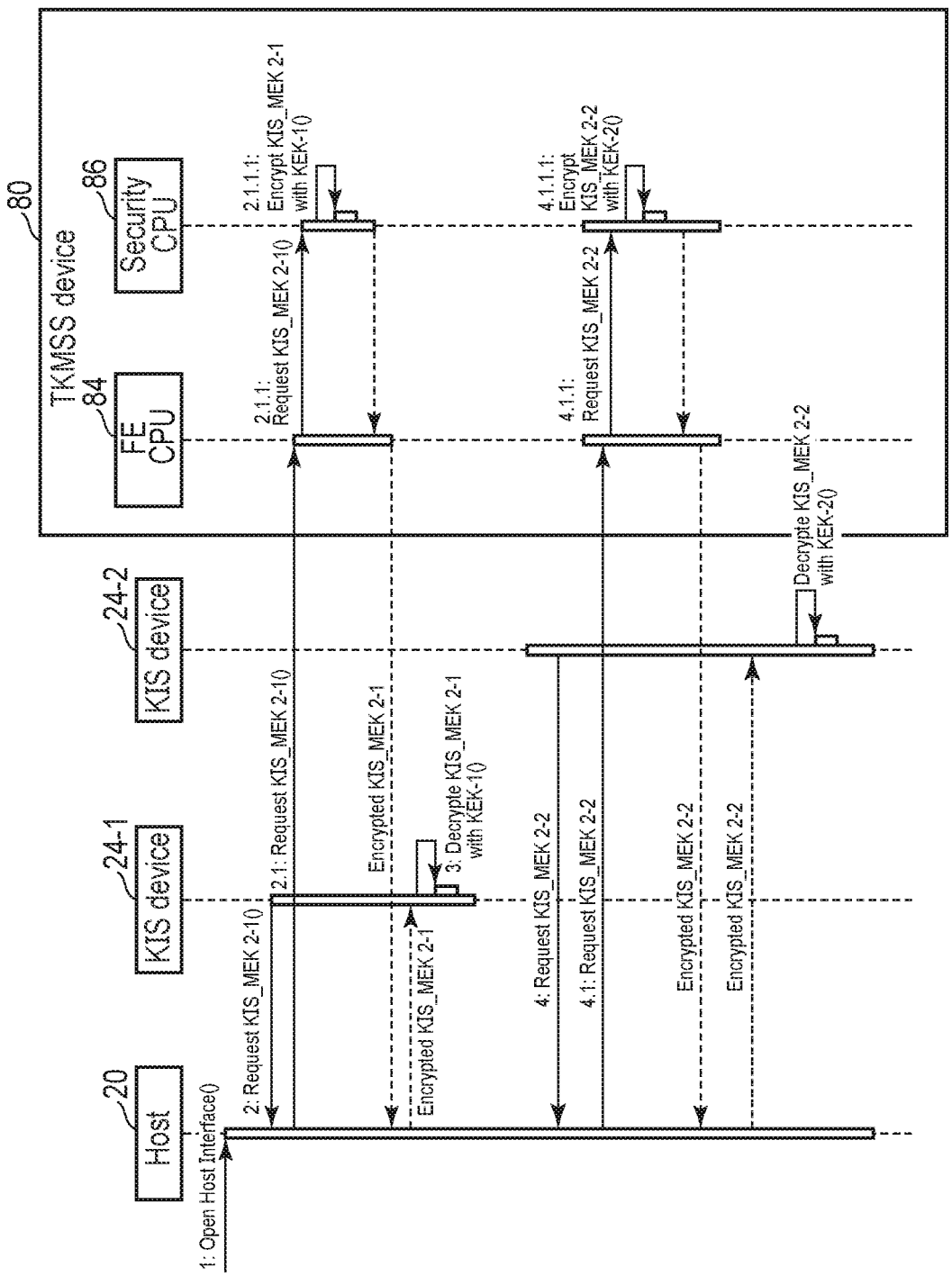
FIG. 18 is a sequence diagram of an example of transmission of a KIS_MEK, according to the second embodiment.

FIG. 18 is a sequence diagram of an example of transmission of the KIS_MEK.

The KIS device 24-1 requests the KIS_MEK2-1 to the host 20 (step 2). The host 20 requests the KIS_MEK2-1 to the FE CPU 84 (step 2.1). The FE CPU 84 requests the KIS_MEK2-1 to the security CPU 86 (step 2.1.1). The security CPU 86 encrypts the KIS_MEK2-1 with the KEK-1 (step 2.1.1.1). The security CPU 86 transmits the encrypted KIS_MEK2-1 to the FE CPU 86. The FE CPU 86 transmits the encrypted KIS_MEK2-1 to the host 20. The host 20 transmits the encrypted KIS_MEK2-1 to the KIS device 24-1. The KIS device 24-1 decrypts the encrypted KIS_MEK2-1 using the KEK-1 (step 3).

Similarly, the KIS device 24-2 requests the KIS_MEK2-2 to the host 20 (step 4). The host 20 requests the KIS_MEK2-2 to the FE CPU 84 (step 4.1). The FE CPU 84 requests the KIS_MEK2-2 to the security CPU 86 (step 4.1.1). The security CPU 86 encrypts the KIS_MEK2-2 with the KEK-2 (step 4.1.1.1). The security CPU 86 transmits the encrypted KIS_MEK2-2 to the FE CPU 86. The FE CPU 86 transmits the encrypted KIS_MEK2-2 to the host 20. The host 20 transmits the encrypted KIS_MEK2-2 to the KIS device 24-2. The KIS device 24-2 decrypts the encrypted KIS_MEK2-2 using the KEK-2 (step 5).

The second embodiment can achieve the same advantages of the first embodiment. Furthermore, the second embodiment can detect and prevent tampering of the FW, and protect data of the other KIS devices.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A key management device connectable to a host, comprising:
   a first storage device that includes:
      a first port;
      a first nonvolatile memory; and
      a first controller configured to:
         encrypt, using a first media encryption key, data transmitted from the host and received through the first port; and
   store the encrypted data in the first nonvolatile memory, and a server that includes:
      a second nonvolatile memory, the second nonvolatile memory storing a first key; and
      a second controller configured to transmit the first key from the second nonvolatile memory to the first storage device without passing through the host, wherein
   the first controller of the first storage device is configured to generate the first media encryption key using the first key; and
   the second controller of the server is further configured to:
      manage a public key of the host;
      receive a second key from the host, the second key accompanying a signature of a user of the host, the signature being generated using a private key of the host;
      perform a verification of the signature of the user of the host using the public key; and
      upon the verification succeeding, transmit the second key to the first storage device.

2. The key management device of claim 1, wherein the first key is transmitted from the server to the first storage device without passing through an external network.

3. The key management device of claim 1, wherein the second controller of the server is configured to transmit the first key to the first storage device through the first port.

4. The key management device of claim 1, wherein the first storage device further includes a third port different from the first port, the third port not connecting to the host, and
the second controller of the server is configured to transmit the first key to the first storage device through the third port.

5. The key management device of claim 1, wherein the second controller of the server is further configured to:
   manage a key encryption key;
   encrypt the first key using the key encryption key; and
   transmit the encrypted first key to the first storage device.

6. The key management device of claim 1, wherein the first controller of the first storage device is configured to generate the first media encryption key using the first key and the second key.

7. The key management device of claim 1, wherein the first controller of the first storage device is configured to generate the first media encryption key using the first key and identification information of a user transmitted from the host.

8. The key management device of claim 7, wherein the first controller of the first storage device is configured to receive the identification information through the first port.

9. The key management device of claim 1, wherein the first storage device and the server are mounted in a single package or on a single circuit board.

10. The key management device of claim 1, wherein a region of the second nonvolatile memory of the server in which the first key is stored is locked at a boot up of the key management device, and
the server further includes a third controller configured to:
   perform a verification of a signature of the host; and
   upon the verification succeeding, unlock the region of the second nonvolatile memory.

11. A storage system connectable to a host, comprising:
   a first storage device that includes:
      a first port;
      a first nonvolatile memory; and
      a first controller configured to:
      encrypt, using a first media encryption key, data transmitted from the host and received through the first port; and
      store the encrypted data in the first nonvolatile memory;
   a second storage device that includes:
      a second port;
      a second nonvolatile memory; and
      a second controller configured to:
      encrypt, using a second media encryption key, data transmitted from the host and received through the second port; and
      store the encrypted data in the second nonvolatile memory; and
   a server that includes:
      a third nonvolatile memory, the third nonvolatile memory storing a first key and a second key; and
      a third controller configured to:
      transmit the first key from the third nonvolatile memory to the first storage device without passing through the host, and
      transmit the second key from the third nonvolatile memory to the second storage device without passing through the host, wherein
   the first controller of the first storage device is configured to generate the first media encryption key using the first key and identification information of a user transmitted from the host, and
   the second controller of the second storage device is configured to generate the second media encryption key using the second key and the identification information of the user transmitted from the host.

12. The storage system of claim 11, wherein the first key is transmitted from the server to the first storage device without passing through an external network, and the second key is transmitted from the server to the second storage device without passing through the external network.

13. The storage system of claim 11, wherein the third controller of the server is configured to:
   transmit the first key to the first storage device through the first port; and transmit the second key to the second storage device through the second port.

14. The storage system of claim 11, wherein
a region of the third nonvolatile memory of the server in which the first key and the second key are stored is locked at a boot up of the storage system, and
the server further includes a fourth controller configured to:
  perform a verification of a signature of the host; and
  upon the verification succeeding, unlock the region of the third nonvolatile memory.

15. The storage system of claim 11, wherein
the second controller of the second storage device is further configured to transmit, to the host through the second port, a first request fir the second key.

16. The storage system of claim 15, wherein
the third controller of the server is configured to, upon receiving a second request that is transmitted from the host in response to the first request, read the second key from the second nonvolatile memory.

17. The storage system of claim 16, wherein
the server further includes a third port, and
the third controller of the server is further configured to transmit the read second key to the host through the third port.

18. The storage system of claim 17, wherein
the second controller of the second storage device is configured to generate the second media encryption key using the second key receive from the host through the second port.

* * * * *